US011892032B2

United States Patent
Omori

(10) Patent No.: US 11,892,032 B2
(45) Date of Patent: Feb. 6, 2024

(54) THRUST FOIL BEARING

(71) Applicant: IHI Corporation, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 101 days.

(21) Appl. No.: 17/423,442

(22) PCT Filed: Jan. 20, 2020

(86) PCT No.: PCT/JP2020/001779
§ 371 (c)(1),
(2) Date: Jul. 15, 2021

(87) PCT Pub. No.: WO2020/149421
PCT Pub. Date: Jul. 23, 2020

(65) Prior Publication Data
US 2022/0090626 A1    Mar. 24, 2022

(30) Foreign Application Priority Data
Jan. 18, 2019    (JP) .................................. 2019-006811

(51) Int. Cl.
*F16C 17/04*    (2006.01)
*F16C 27/02*    (2006.01)
*F16C 43/02*    (2006.01)

(52) U.S. Cl.
CPC ............ *F16C 17/042* (2013.01); *F16C 27/02* (2013.01); *F16C 43/02* (2013.01)

(58) Field of Classification Search
CPC .................................................. F16C 17/042
See application file for complete search history.

(56) References Cited

U.S. PATENT DOCUMENTS

| 5,540,505 A | 7/1996 | Struziak |
| 6,702,463 B1 * | 3/2004 | Brockett ............... F16C 17/042 384/103 |

(Continued)

FOREIGN PATENT DOCUMENTS

| JP | 11-503812 A | 3/1999 |
| JP | 2007-92994 A | 4/2007 |

(Continued)

OTHER PUBLICATIONS

Translation of WO2015/087677 obtained Jan. 19, 2023.*

(Continued)

*Primary Examiner* — James Pilkington
(74) *Attorney, Agent, or Firm* — ROTHWELL, FIGG, ERNST & MANBECK, P.C.

(57) ABSTRACT

A thrust foil bearing includes: a base plate including an insertion hole through which a shaft is inserted; and a top foil disposed around the insertion hole, wherein the top foil includes: a slit dividing the top foil into an inner area and an outer area in a radial direction of the insertion hole; a sandwiched part disposed in the outer area; an extending part extending from the sandwiched part to the inner area; and an inclined part being in the inner area, having an end on one side in a circumferential direction of the insertion hole connected to the extending part, extending from the extending part toward another side in the circumferential direction, and inclined with respect to a flat surface of the base plate extending a direction orthogonal to an axial direction of the insertion hole.

10 Claims, 28 Drawing Sheets

(56) References Cited

U.S. PATENT DOCUMENTS

| | | | |
|---|---|---|---|
| 9,970,479 B2* | 5/2018 | Omori | F16C 17/042 |
| 10,138,934 B2* | 11/2018 | Omori | F16C 27/02 |
| 2005/0271311 A1 | 12/2005 | Saville et al. | |
| 2012/0207414 A1 | 8/2012 | Kim | |
| 2014/0169707 A1 | 6/2014 | Yoshino | |
| 2015/0219147 A1 | 8/2015 | Furuno | |
| 2016/0356310 A1 | 12/2016 | Yoshino et al. | |
| 2021/0341013 A1* | 11/2021 | Omori | F16C 27/02 |

FOREIGN PATENT DOCUMENTS

| | | |
|---|---|---|
| JP | 2008-501922 A | 1/2008 |
| JP | 2009-185857 A | 8/2009 |
| JP | 2011-106685 A | 6/2011 |
| JP | 2013-506805 A | 2/2013 |
| JP | 2013-61024 A | 4/2013 |
| JP | 2017-180672 A | 10/2017 |
| WO | 2014/061698 A1 | 4/2014 |
| WO | 2015/087677 A1 | 6/2015 |
| WO | 2015/157052 A1 | 10/2015 |

OTHER PUBLICATIONS

International Search Report and Written Opinion dated Mar. 3, 2020 in International Application No. PCT/JP2020/001779 with English translation (12 pages total).

* cited by examiner

THRUST FOIL BEARING

CROSS REFERENCE TO RELATED APPLICATION

This application is a 35 U.S.C. 371 National Phase Entry Application from PCT/JP2020/001779, filed Jan. 20, 2020, which claims priority to Japanese Patent Application No. 2019-006811, filed Jan. 18, 2019, the disclosures of which are incorporated herein in their entirety by reference, and priority is claimed to each of the foregoing.

TECHNICAL FIELD

The present disclosure relates to a thrust foil bearing.

BACKGROUND

Conventionally, as a bearing for a high-speed rotating body, a thrust foil bearing that is disposed to face a thrust collar provided on a rotary shaft is known (refer to, for example, Patent Document 1 below). The bearing surface of the thrust foil bearing is formed of a flexible foil (thin metal plate) in order to be able to absorb the movement of the rotary shaft (the axial movement and inclination of the thrust collar) caused by vibration or impact, and the thrust foil bearing has a foil structure under the bearing surface in order to flexibly support the bearing surface.

A thrust foil bearing has a configuration in which a plurality of top foil pieces and a plurality of back foil pieces are arranged in the circumferential direction. The top foil piece is supported by the back foil piece, and the rotation of the thrust collar causes lubricating fluid to flow into a gap between the top foil piece and the thrust collar. The lubricating fluid forms a wedge-shaped fluid lubrication film between the top foil piece and the thrust collar, and the load capacity of the thrust foil bearing is obtained.

DOCUMENT OF RELATED ART

Patent Document

[Patent Document 1] PCT International Publication No. WO 2014/061698 A1

SUMMARY

Technical Problem

In the above related art, the top foil is attached to a base plate using welding (spot-welding) because the top foil may fall off the base plate. However, when using the welding, the top foil may be deformed due to heat. As a result, the top foil may distort, which affects the formation of the fluid lubricating film, and thus a sufficient load capacity of the thrust foil bearing may not be obtained.

The present disclosure is made in view of the above problems, and an object thereof is to provide a method of attaching the top foil through sandwiching.

Solution to Problem

In order to solve the above problems, a thrust foil bearing of a first aspect of the present disclosure includes: a base plate including an insertion hole through which a shaft is inserted; and a top foil disposed around the insertion hole, wherein the top foil includes: a slit dividing the top foil into an inner area and an outer area in a radial direction of the insertion hole; a sandwiched part disposed in the outer area; an extending part extending from the sandwiched part to the inner area; and an inclined part being in the inner area, having an end on one side in a circumferential direction of the insertion hole connected to the extending part, extending from the extending part toward another side in the circumferential direction, and inclined with respect to a flat surface of the base plate extending a direction orthogonal to an axial direction of the insertion hole.

A second aspect of the present disclosure is that in the thrust foil bearing of the first aspect, an annular member is attached to the base plate, and the sandwiched part is sandwiched between the base plate and the annular member.

A third aspect of the present disclosure is that the thrust foil bearing of the second aspect includes a fastening member attaching the annular member to the base plate, wherein the sandwiched part is provided with a through-hole through which the fastening member is inserted.

A fourth aspect of the present disclosure is that in the thrust foil bearing of the third aspect, a plurality of the through-holes are provided in the sandwiched part.

A fifth aspect of the present disclosure is that in the thrust foil bearing of any one of the first to fourth aspects, the sandwiched part is formed into an annular shape.

A sixth aspect of the present disclosure is that in the thrust foil bearing of any one of the first to fifth aspects, the sandwiched part is connected with a plurality of the inclined parts through a plurality of the extending parts, the slit extends from an edge on the other side in the circumferential direction of the inclined part toward the one side in the circumferential direction, and the top foil is provided with a second slit, the second slit extending from a radially inner side toward a radially outer side along the edge on the other side in the circumferential direction of the inclined part and being connected to the slit at a position on the radially outer side of the inclined part.

A seventh aspect of the present disclosure is that in the thrust foil bearing of any one of the first to sixth aspects, an end on the other side in the circumferential direction of the inclined part is a free end.

An eighth aspect of the present disclosure is that in the thrust foil bearing of any one of the first to seventh aspects, an end on the one side in the circumferential direction of the extending part is provided with a bent part, the bent part being bent toward the base plate or being bent toward a distant side from the base plate.

A ninth aspect of the present disclosure is that in the thrust foil bearing of the eighth aspect, the base plate is provided with an insertion groove into which the bent part being bent toward the base plate is inserted.

A tenth aspect of the present disclosure is that in the thrust foil bearing of the first or second aspect, the extending part includes a fixed part that is fixed to the base plate.

Effects

According to the present disclosure, it is possible to limit a deterioration in the load capacity of the thrust foil bearing due to the distortion of the top foil.

DESCRIPTION OF EMBODIMENTS

Hereinafter, thrust foil bearings of the present disclosure will be described in detail with reference to the drawings.

Figure 1:
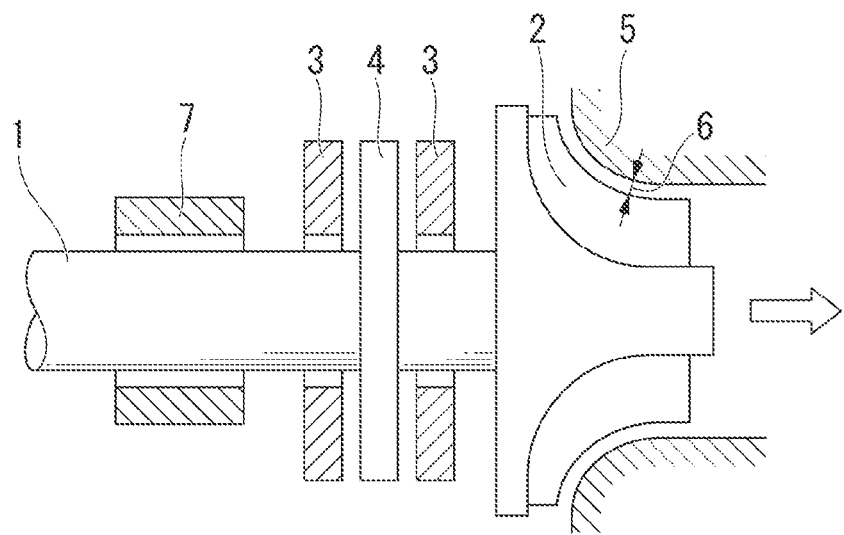
FIG. 1 is a side view showing an example of a turbo machine to which a thrust foil bearing of the present disclosure is applied.

FIG. 1 is a side view showing an example of a turbo machine to which a thrust foil bearing of the present disclosure is applied.

In FIG. 1, a reference sign 1 represents a rotary shaft (shaft), a reference sign 2 represents an impeller provided at an end part of the rotary shaft, and a reference sign 3 represents a thrust foil bearing of the present disclosure.

A disk-shaped thrust collar 4 is attached to the rotary shaft 1. The thrust collar 4 is disposed between a pair of thrust foil bearings 3. The impeller 2 is disposed inside a housing 5 that is on a stationary side, and a tip clearance 6 is provided between the impeller 2 and the housing 5. The rotary shaft 1 is supported by a radial foil bearing 7.

First Embodiment

Figure 2:
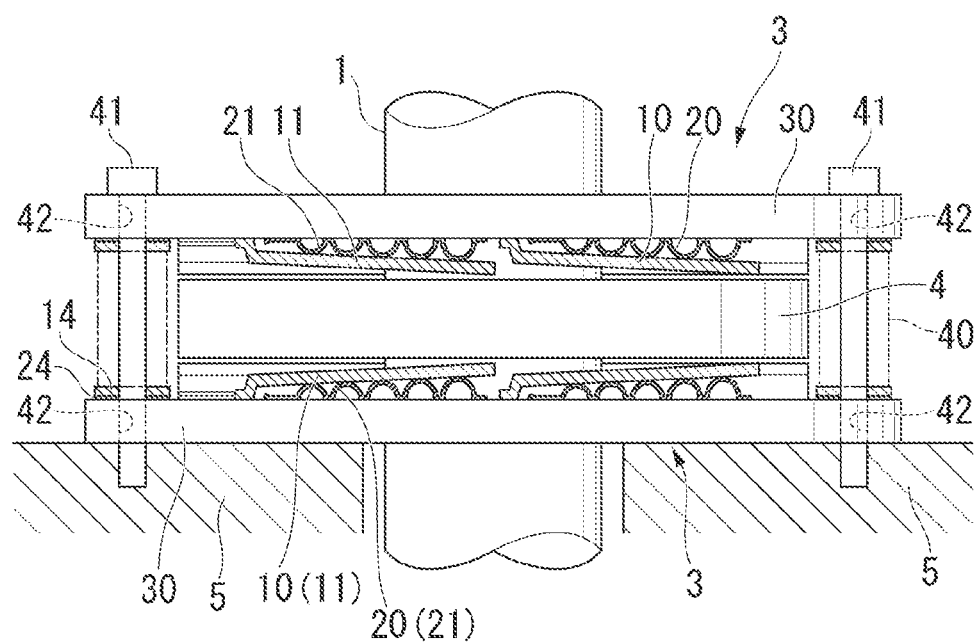
FIG. 2 is a side view showing a thrust foil bearing of a first embodiment of the present disclosure.

FIG. 2 is a side view showing a thrust foil bearing 3 of a first embodiment of the present disclosure.

As shown in FIG. 2, a pair of the thrust foil bearings 3 are provided on two sides of the thrust collar 4 so that the thrust collar 4 is disposed therebetween. The pair of thrust foil bearings 3 have an equal configuration. The thrust foil bearing 3 includes a top foil 10, a back foil 20, and a base plate 30.

A cylindrical bearing spacer 40 (annular member) shown by a dashed double-dotted line in FIG. 2 is sandwiched between base plates 30 of the pair of thrust foil bearings 3. The base plates 30 are connected together by fastening bolts 41 (fastening member) through the bearing spacer 40. The outer periphery of the base plate 30 is provided with through-holes 42 through which the fastening bolts 41 are inserted. Either one of the base plates 30 of the present disclosure is in contact with the housing 5 by tightening the fastening bolts 41.

Figure 3:
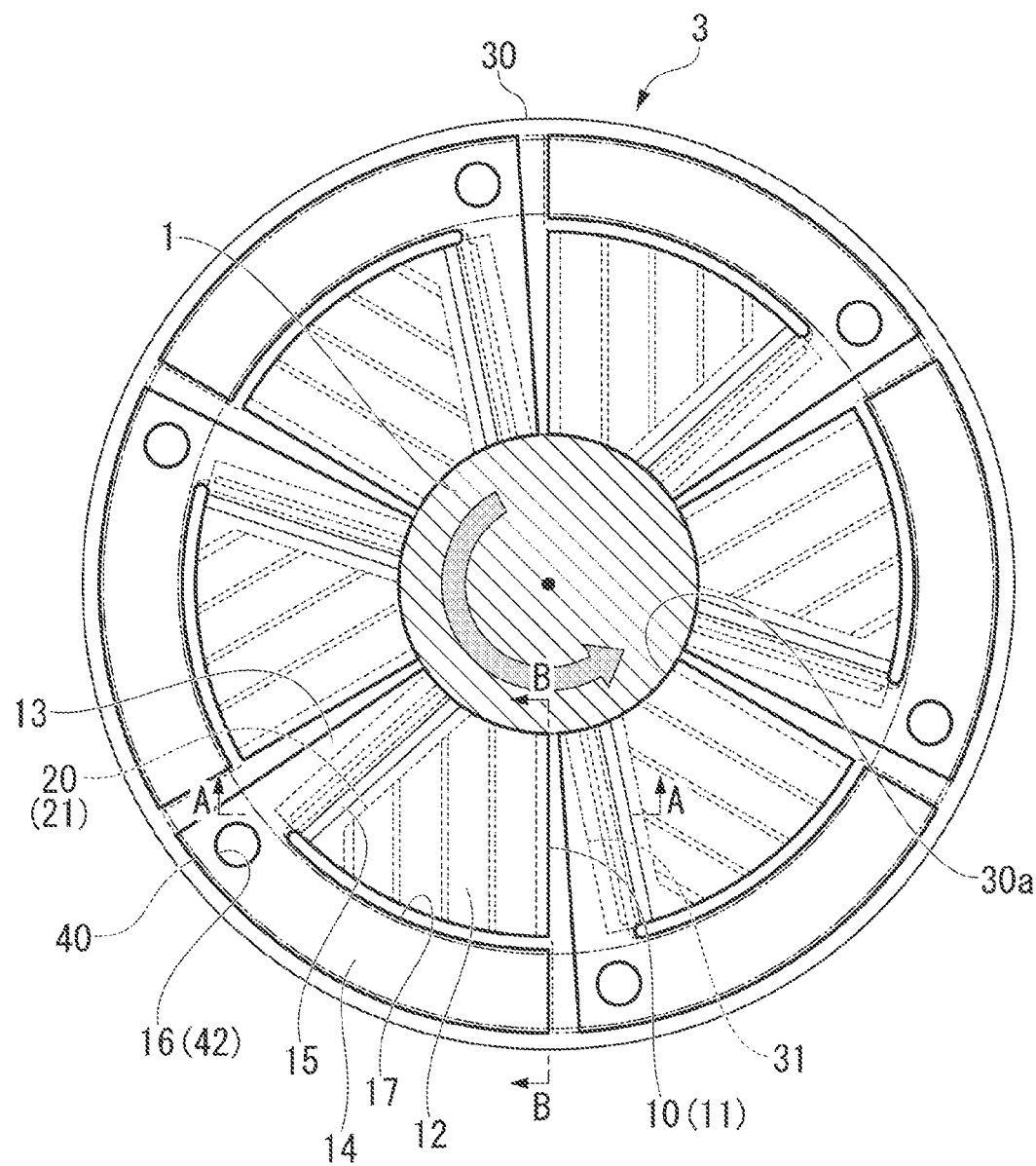
FIG. 3 is a plan view showing the thrust foil bearing of the first embodiment of the present disclosure.
Figure 4:
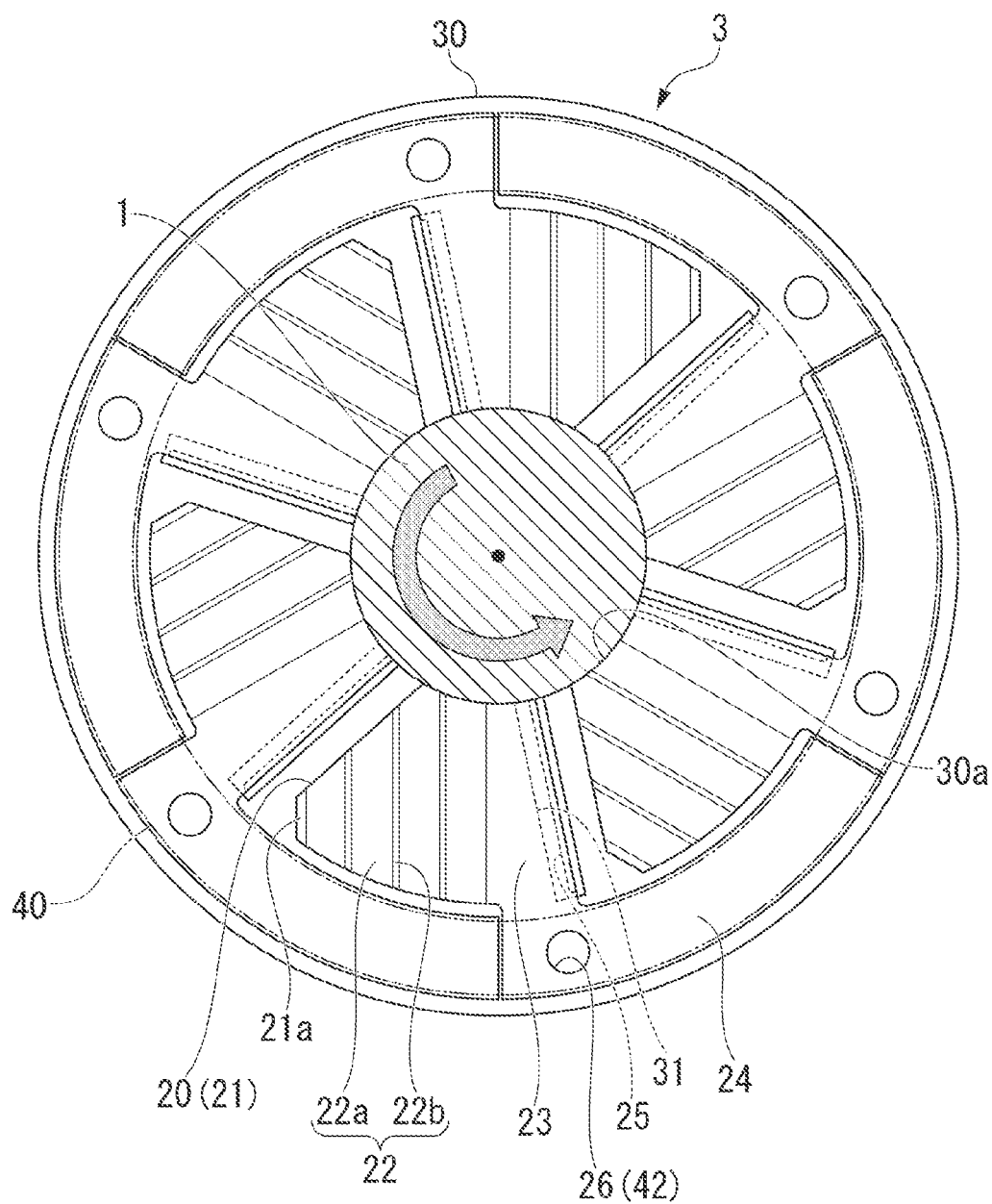
FIG. 4 is a plan view showing a state in which a top foil is removed from the thrust foil bearing shown in FIG. 3.
Figure 5:
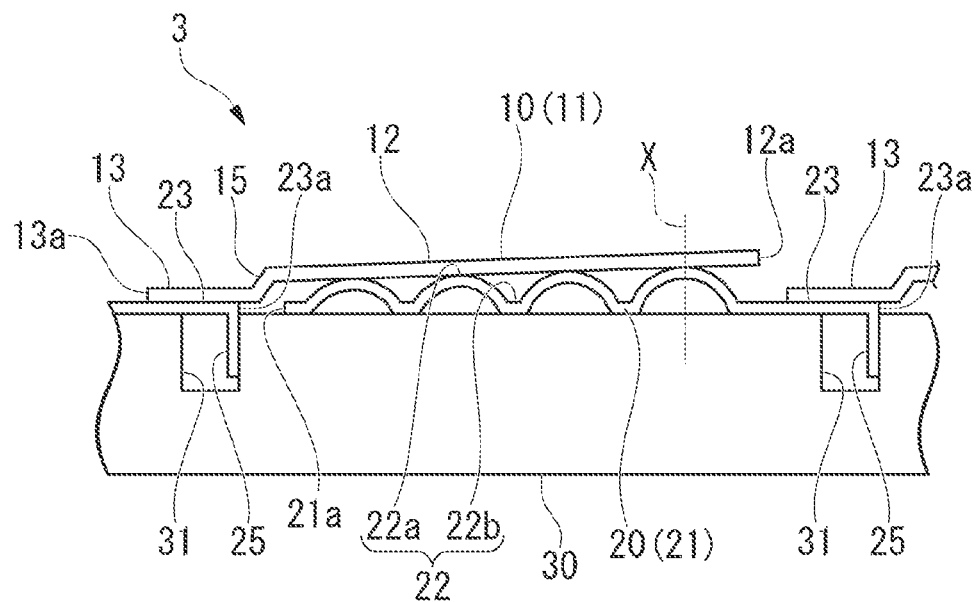
FIG. 5 is a cross-sectional view taken along line A-A and viewed in an arrow direction in FIG. 3.
Figure 6:
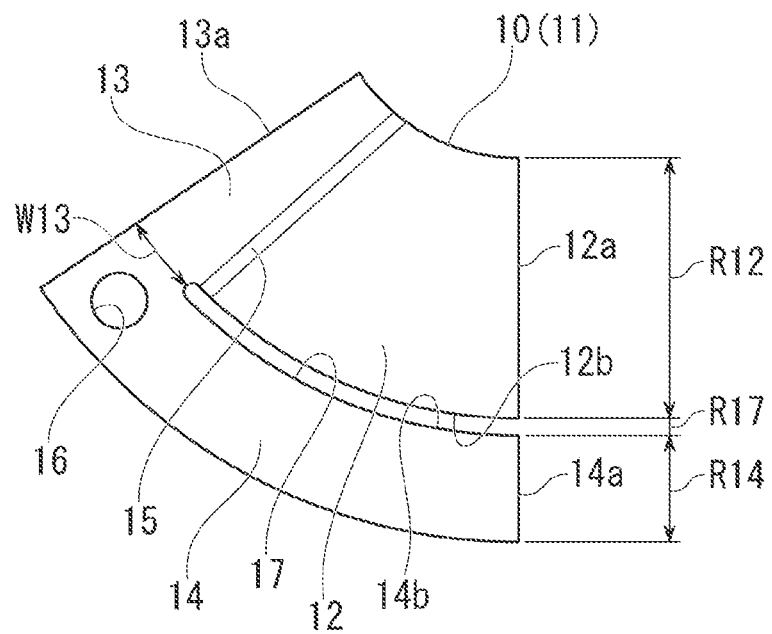
FIG. 6 is a plan view showing the top foil provided in the thrust foil bearing shown in FIG. 3.
Figure 7:
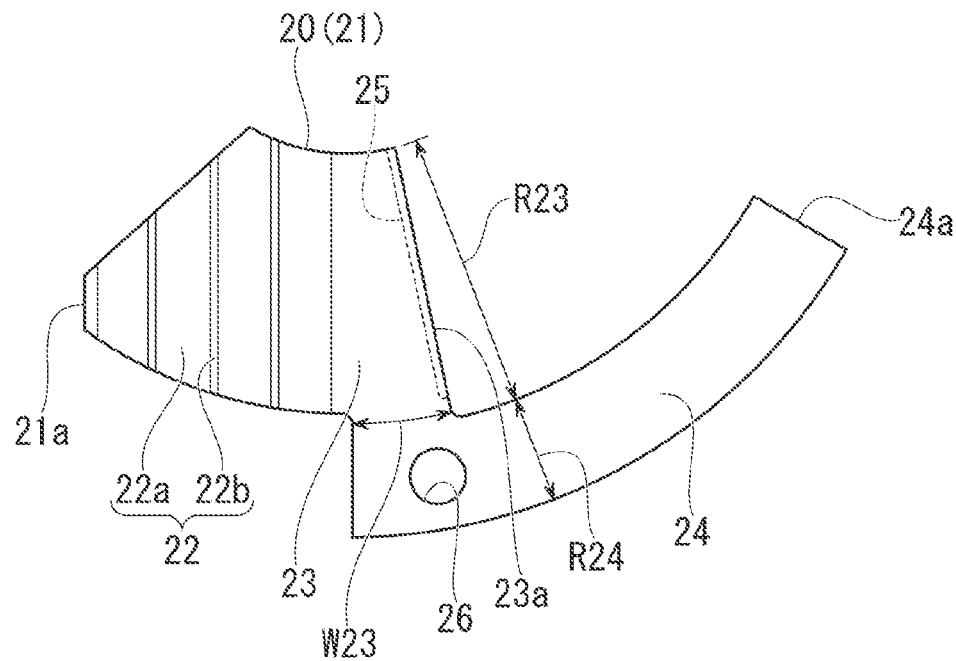
FIG. 7 is a plan view showing a back foil provided in the thrust foil bearing shown in FIG. 3.
Figure 8:
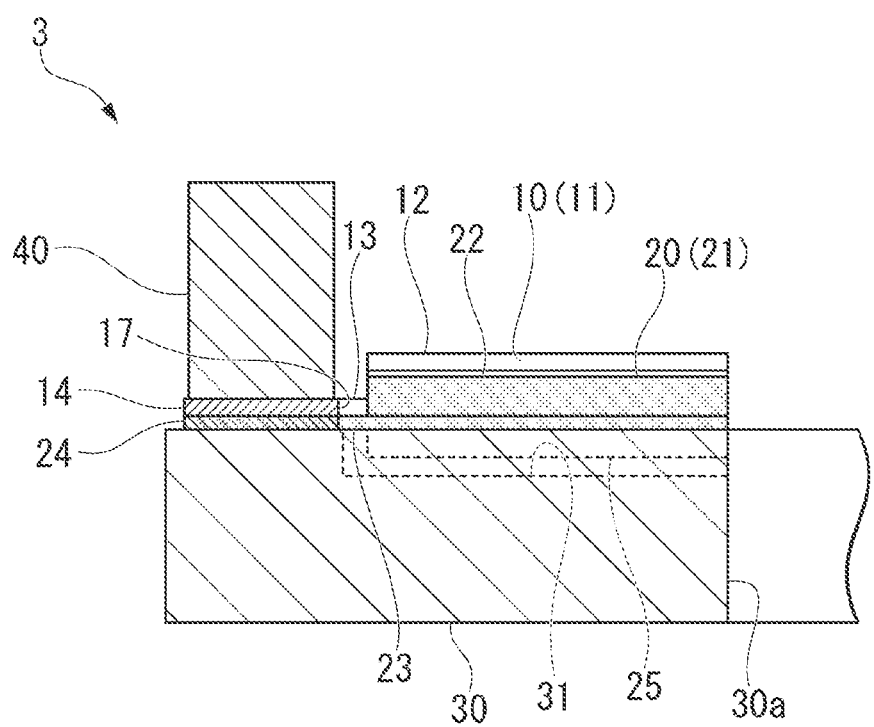
FIG. 8 is a cross-sectional view taken along line B-B and viewed in an arrow direction in FIG. 3.

FIG. 3 is a plan view showing the thrust foil bearing 3 of the first embodiment of the present disclosure. FIG. 4 is a plan view showing a state in which the top foil 10 is removed from the thrust foil bearing 3 shown in FIG. 3. FIG. 5 is a cross-sectional view taken along line A-A and viewed in an arrow direction in FIG. 3. FIG. 6 is a plan view showing the top foil 10 provided in the thrust foil bearing 3 shown in FIG. 3. FIG. 7 is a plan view showing the back foil 20 provided in the thrust foil bearing 3 shown in FIG. 3. FIG. 8 is a cross-sectional view taken along line B-B and viewed in an arrow direction in FIG. 3.

As shown in FIG. 3, the base plate 30 includes an insertion hole 30a through which the rotary shaft 1 is inserted.

In the following description, the positional relationship of each member may be described with reference to the insertion hole 30a. Specifically, an "axial direction" refers to a direction in which the insertion hole 30a extends (a direction in which the rotary shaft 1 is inserted). A "radial direction" refers to a radial direction of the insertion hole 30a. A "circumferential direction" refers to a circumferential direction along an inner peripheral surface of the insertion hole 30a. In other words, the radial direction and the circumferential direction can refer to a "radial direction" and a "circumferential direction" with reference to the central axis of the rotary shaft 1 inserted through the insertion hole 30a and as viewed from the central axis.

A "plan view" refers to a view viewed in the axial direction.

The base plate 30 forms the outermost part (part on a distant side from the thrust collar) of the thrust foil bearing 3 in the axial direction. The base plate 30 is provided with the insertion hole 30a. That is, the base plate 30 of the present disclosure is a disk-shaped member provided with the insertion hole 30a. However, as long as the insertion hole 30a is provided, the base plate 30 may be a member other than a disk shape (for example, a rectangular plate shape). The insertion hole 30a does not have to necessarily have a strict cylindrical shape (circular shape in a plan view).

The base plate 30 is formed of, for example, a metal plate having a thickness of about several millimeters. The top foil 10 and the back foil 20 are disposed around the insertion hole 30a (opening) on a flat surface of the base plate 30, and the flat surface is disposed to face the thrust collar 4. Specifically, the top foil 10 is supported by the back foil 20, and the back foil 20 is supported by the base plate 30. That is, the top foil 10 is also supported by the base plate 30 through the back foil 20.

In the present disclosure, the top foil 10 is formed of a plurality (six) of top foil pieces 11, and the back foil 20 is formed of a plurality (six) of back foil pieces 21. The base plate 30 supports the six top foil pieces 11 and the six back foil pieces 21 at regular intervals in the circumferential direction of the flat surface facing the thrust collar 4. The number of the top foil pieces 11 and the back foil pieces 21 is not limited to six.

For example, each number of the top foil pieces 11 and the back foil pieces 21 may be 3, 4, 5, 7, 8, 9 or the like.

As shown in FIG. 3, the top foil 10 is formed of six thin metal plates (the top foil pieces 11) arranged in the circumferential direction. The top foil piece 11 includes an inclined part 12 inclined to extend upward (toward a viewer viewing FIG. 3, in a direction toward the thrust collar 4 (not shown in FIG. 3), or in a direction from the base plate 30 or toward the top foil piece 11 in the axial direction) and in a direction from one side (i.e., the leading side in the rotation direction of the rotary shaft 1) in the circumferential direction toward the other side (i.e., the trailing side in the rotation direction of the rotary shaft 1) in the circumferential direction, an extending part 13 connected to the one side in the circumferential direction of the inclined part 12 and extending outward in the radial direction, and a sandwiched part 14 connected to the extending part 13 at a radially outer position than the inclined part 12 and extending toward the other side in the circumferential direction.

As shown in FIG. 6, the inclined part 12 is formed into an approximately trapezoidal shape obtained by removing, from a sector shape, an apex side thereof and in which the radially inner side and the radially outer side thereof are each arcuate. That is, the inclined part 12 includes two edges separated from each other in the circumferential direction and extending from the radially inner side to the radially outer side, an inner peripheral edge connecting the two edges on the radially inner side, and an outer peripheral edge connecting the two edges on the radially outer side. An edge (hereinafter, referred to as an end part 12a on the other side in the circumferential direction) being on the other side in the circumferential direction of the inclined part 12 and extending from the radially inner side to the radially outer side is a free end.

On the other hand, an edge being on the one side in the circumferential direction of the inclined part 12 and extending from the radially inner side to the radially outer side is connected to the extending part 13 through a bent part 15. As shown in FIG. 5, the bent part 15 is formed of a first bend and a second bend positioned on the other side in the circumferential direction of the first bend. The first bend is bent toward an opposite side from a surface of the top foil piece 11 facing the base plate 30. The second bend is bent toward the surface of the top foil piece 11 facing the base plate 30. That is, the bent part 15 has a stepped shape. Both of the first and second bends have obtuse angles.

In other words, the first bend of the bent part 15 is bent to protrude toward the base plate 30, and the second bend is bent to protrude toward the thrust collar 4 (not shown in FIG. 5).

A portion of the inclined part 12 positioned on the other side in the circumferential direction of the bent part 15 is supported by a support 22 described below of the back foil piece 21. The portion of the inclined part 12 supported by the support 22 is disposed to be inclined at an initial inclination angle to extend away from the base plate 30 and in a direction from the one side toward the other side in the circumferential direction. The initial inclination angle denotes an inclination angle of the top foil piece 11 with respect to the base plate 30 (i.e., the flat surface of the base plate 30) with no load. The base plate 30 of the present disclosure includes the flat surface extending in a direction orthogonal to the axial direction, and the inclined part 12 is inclined with respect to the flat surface.

The extending part 13 is connected to the one side (the first bend side) in the circumferential direction of the bent part 15. As shown in FIG. 6, the extending part 13 is formed into a strip shape extending outward in the radial direction and is connected to the sandwiched part 14.

Similarly to the inclined part 12, the sandwiched part 14 is formed into an approximately trapezoidal shape obtained by removing, from a sector shape, an apex side thereof and in which the radially inner side and the radially outer side thereof are each arcuate. That is, the sandwiched part 14 includes two edges separated from each other in the circumferential direction and extending from the radially inner side to the radially outer side, an inner peripheral edge connecting the two edges on the radially inner side, and an outer peripheral edge connecting the two edges on the radially outer side.

The circumferential position of an edge (hereinafter, referred to as an end part 14a on the other side in the circumferential direction) being on the other side in the circumferential direction of the sandwiched part 14 and extending from the radially inner side to the radially outer side corresponds to the circumferential position of the end part 12a on the other side in the circumferential direction of the inclined part 12. However, the circumferential positions of the end part 14a of the sandwiched part 14 and the end part 12a of the inclined part 12 do not have to necessarily correspond to each other. The circumferential position of an edge being on the one side in the circumferential direction of the sandwiched part 14 and extending from the radially inner side to the radially outer side corresponds to the circumferential position of an edge (hereinafter, referred to as an end part 13a on the one side in the circumferential direction) being on the one side in the circumferential direction of the extending part 13 and extending from the radially inner side to the radially outer side.

An edge (hereinafter, referred to as an end part 14b on the radially inner side) of the sandwiched part 14 that connects, at a position on the radially inner side, the two edges of the sandwiched part 14 extending from the radially inner side to the radially outer side is separated in the radial direction from an edge (hereinafter, referred to as an end part 12b on the radially outer side) of the inclined part 12 that connects, at a position on the radially outer side, the two edges of the inclined part 12 extending from the radially inner side to the radially outer side. That is, a slit 17 is provided between the end part 14b on the radially inner side of the sandwiched part 14 and the end part 12b on the radially outer side of the inclined part 12.

The slit 17 divides the top foil piece 11 into an inner area and an outer area in the radial direction. The slit 17 extends in the circumferential direction from a first side edge toward a second side edge of the top foil piece 11, the first side edge is on the other side in the circumferential direction of the top foil piece 11 and extends from the radially inner side to the radially outer side, and the second side edge is on the one side in the circumferential direction of the top foil piece 11 and extends from the radially inner side to the radially outer side. That is, the first side edge of the top foil piece 11 is formed of the end part 12a on the other side in the circumferential direction of the inclined part 12 and the end part 14a on the other side in the circumferential direction of the sandwiched part 14, which are separated from each other through the slit 17. The second side edge of the top foil 10 is formed of the end part 13a on the one side in the circumferential direction of the extending part 13 without separation. The slit 17 of the present disclosure further extends toward the one side in the circumferential direction than the bent part 15. The one side in the circumferential direction of the slit 17 is formed to have an R-shape (rounded shape).

The size R14 in the radial direction of the end part 14a on the other side in the circumferential direction of the sandwiched part 14 is less than the size R12 in the radial direction of the end part 12a on the other side in the circumferential direction of the inclined part 12. The ratio of the size R12 to the size R14 of the present disclosure is about 2:1. The size R17 in the radial direction of the slit 17 is considerably less than the size R14 in the radial direction of the sandwiched part 14.

The inclined part 12 is disposed in the inner area than the slit 17, and the sandwiched part 14 is disposed in the outer area than the slit 17. As shown in FIG. 3, the outer area than the slit 17 extends to a radial position where the bearing spacer 40 is disposed. That is, the sandwiched part 14 is sandwiched between the base plate 30 and the bearing spacer 40 in the axial direction.

The sandwiched part 14 is provided with a through-hole 16 through which the fastening bolt 41 for attaching the bearing spacer 40 to the base plate 30 is inserted. The through-hole 16 of the sandwiched part 14 overlaps the through-hole 42 of the base plate 30 in the axial direction. The through-hole 16 of the sandwiched part 14 is disposed to be close to the connection position of the sandwiched part 14 with the extending part 13. The size W13 (refer to FIG. 6) in the circumferential direction of an area where the extending part 13 connects to the sandwiched part 14 is greater than the diameter of the through-hole 16.

The size R14 in the radial direction of the sandwiched part 14 of the present disclosure is greater than the diameter of the through-hole 16. As shown in FIG. 3, the size R14 in the radial direction of the sandwiched part 14 may be approximately equal to a size in the radial direction from the inner peripheral surface to the outer peripheral surface of the bearing spacer 40 in order that approximately the entire area of the sandwiched part 14 can contact the bearing spacer 40. The sandwiched part 14 may have a circumferential length corresponding to about 60° (about ⅙ of the entire circumference) out of 360° of the entire circumference of the bearing spacer 40. Thereby, the six top foil pieces 11 (the sandwiched parts 14) are sandwiched by approximately the entire circumference of the bearing spacer 40.

As shown in FIG. 4, the back foil 20 is formed of six thin metal plates (the back foil pieces 21) arranged in the circumferential direction. The back foil piece 21 includes the support 22 supporting the inclined part 12 of the top foil piece 11, a flat part 23 connected to the other side in the circumferential direction of the support 22, and a sandwiched part 24 extending outward in the radial direction from the flat part 23.

As shown in FIG. 5, the support 22 is a wavy foil (bump foil) in which hill parts 22a and valley parts 22b are alternately formed. The support 22 elastically supports the inclined part 12 of the top foil piece 11. For the support 22, for example, a bump foil, a spring foil shown in Japanese Unexamined Patent Application, First Publication No. 2006-57652 or Japanese Unexamined Patent Application, First Publication No. 2004-270904, a back foil shown in Japanese Unexamined Patent Application, First Publication No. 2009-299748, or the like can be used.

Although the spring foils shown in Japanese Unexamined Patent Application, First Publication No. 2006-57652 and Japanese Unexamined Patent Application, First Publication No. 2004-270904, and the back foil shown in Japanese Unexamined Patent Application, First Publication No. 2009-299748 are foils used for a radial bearing, when the foils are unfolded into a planar shape and are formed into an annular shape, they can be foils (the support 22) used for the thrust foil bearing 3.

The support 22 of the present disclosure is formed of a bump foil. The support 22 is formed to be slightly smaller than the inclined part 12 of the top foil piece 11 in the plan view shown in FIG. 3. Therefore, the support 22 is covered by the inclined part 12. As shown in FIG. 7, the support 22 is formed into an approximately trapezoidal shape obtained by removing, from a sector shape, an apex side thereof and in which the radially inner side and the radially outer side thereof are each arcuate. That is, the support 22 includes two edges separated from each other in the circumferential direction and extending from the radially inner side to the radially outer side thereof, an inner peripheral edge connecting the two edges on the radially inner side, and an outer peripheral edge connecting the two edges on the radially outer side.

An edge (hereinafter, referred to as an end part on the one side in the circumferential direction) being on the one side in the circumferential direction of the support 22 and extending from the radially inner side to the radially outer side is provided with a parallel part (hereinafter, referred to as a back foil end 21*a*) extending in parallel to an edge (hereinafter, referred to as an end part on the other side in the circumferential direction) being on the other side in the circumferential direction of the support 22 and extending from the radially inner side to the radially outer side. In the support 22, the valley parts 22*b* and the hill parts 22*a* are alternately continuously disposed from the back foil end 21*a* toward the end part on the other side in the circumferential direction of the support 22, in other words, in a normal direction (i.e., a direction orthogonal to the ridge line of the hill part 22*a*) orthogonal to the back foil end 21*a* and the end part on the other side in the circumferential direction of the support 22.

As shown in FIG. 5, the valley part 22*b* includes a flat surface and faces the base plate 30. The hill part 22*a* is formed into an arched part connecting the adjacent valley parts 22*b*. The back foil piece 21 is supported by the base plate 30. Therefore, the valley part 22*b* can contact the base plate 30. Two end parts of the support 22, in other words, the back foil end 21*a* and the end part on the other side in the circumferential direction of the support 22, are provided with the valley parts 22*b*.

In the present disclosure, the valley parts 22*b* and the hill parts 22*a* are formed at almost equal intervals. As shown in FIG. 5, the hill parts 22*a* are formed to have a height gradually increasing from the back foil end 21*a* toward the end part on the other side in the circumferential direction of the support 22, in other words, toward the trailing side (i.e., from the one side toward the other side in the circumferential direction) of the rotation direction of the rotary shaft 1 (the thrust collar 4) shown by an arrow in FIG. 3. The end part 12*a* on the other side in the circumferential direction of the inclined part 12 is disposed at a position further toward the other side in the circumferential direction than an imaginary straight line X supported by the hill part 22*a* disposed at the closest position to the other side in the circumferential direction of the support 22. The imaginary straight line X is a line where the support 22 contacts the inclined part 12 on the most trailing side in the rotation direction of the rotary shaft 1.

As shown in FIG. 7, the flat part 23 has a shape such that the valley part 22*b* disposed at the end part on the other side in the circumferential direction of the support 22 is further extended toward the other side in the circumferential direction. That is, the flat part 23 has a flat surface that is flush with the valley part 22*b*. An end part 23*a* on the other side in the circumferential direction of the flat part 23 is provided with a bent part 25 that is bent toward the base plate 30. As shown in FIG. 5, the bent part 25 is bent at an approximately right angle toward the base plate 30. As shown in FIG. 7, the bending line of the bent part 25 extends linearly in the radial direction. That is, the bending line of the bent part 25 extends in parallel to the end part 23*a* on the other side in the circumferential direction of the flat part 23.

As shown in FIG. 5, the base plate 30 is provided with an insertion groove 31 into which the bent part 25 of the back foil piece 21 is inserted. In the plan view shown in FIG. 4, the insertion groove 31 has a rectangular shape extending in the radial direction, and a plurality (six) of the insertion grooves 31 are provided in the base plate 30 at intervals in the circumferential direction. The bent parts 15 of the six back foil pieces 21 are inserted into the six insertion grooves 31.

As shown in FIG. 5, the bent part 15 can come into contact with a side wall surface on the other side in the circumferential direction of the insertion groove 31. This configuration limits the back foil piece 21 (the support 22) from moving toward the other side in the circumferential direction. That is, when a load is applied to the support 22 from the inclined part 12, the bent part 25 contacts the side wall surface on the other side in the circumferential direction of the insertion groove 31 and is limited from moving toward the other side in the circumferential direction, and in contrast, the back foil end 21*a* being the free end moves toward the one side in the circumferential direction. As shown in FIG. 5, the extending part 13 of the top foil piece 11 is disposed on the flat part 23 to overlap it. This configuration limits the bent part 25 from coming out of the insertion groove 31.

As shown in FIG. 7, the sandwiched part 24 is provided outside in the radial direction of the flat part 23 and extends further toward the other side in the circumferential direction than the flat part 23. Similarly to the support 22, the sandwiched part 24 is formed into an approximately trapezoidal shape obtained by removing, from a sector shape, an apex side thereof and in which the radially inner side and the radially outer side thereof are each arcuate. That is, the sandwiched part 24 includes two edges separated from each other in the circumferential direction and extending from the radially inner side to the radially outer side, an inner peripheral edge connecting the two edges on the radially inner side, and an outer peripheral edge connecting the two edges on the radially outer side.

The circumferential position of an edge (hereinafter, referred to as an end part 24*a* on the other side in the circumferential direction) being on the other side in the circumferential direction of the sandwiched part 24 and extending from the radially inner side to the radially outer side is a position further toward the other side in the circumferential direction than the circumferential position of the end part 23*a* on the other side in the circumferential direction of the flat part 23. The circumferential position of an edge being on the one side in the circumferential direction of the sandwiched part 24 and extending from the radially inner side to the radially outer side is a position further toward the one side in the circumferential direction than the circumferential position of the end part 23*a* on the other side in the circumferential direction of the flat part 23. The circumferential position of the edge being on the one side in the circumferential direction of the sandwiched part 24 and extending from the radially inner side to the radially outer side is a position further toward the other side in the circumferential direction than the end (the valley part 22*b*) on the other side in the circumferential direction of the support 22.

The size R24 in the radial direction of the sandwiched part 24 is less than the size R23 in the radial direction of the flat part 23. The ratio of the size R23 to the size R24 is about 2:1. As shown in FIG. 4, the sandwiched part 24 extends to a radial position where the bearing spacer 40 is disposed. Therefore, similarly to the sandwiched part 14 of the top foil piece 11, the sandwiched part 24 is sandwiched between the base plate 30 and the bearing spacer 40 in the axial direction. That is, as shown in FIG. 8, the sandwiched part 24 of the back foil piece 21 is sandwiched between the base plate 30 and the bearing spacer 40 while overlapping the sandwiched part 14 of the top foil piece 11.

As shown in FIG. 4, the sandwiched part 24 is provided with a through-hole 26 through which the fastening bolt 41 for attaching the bearing spacer 40 to the base plate 30 is inserted. The through-hole 26 of the sandwiched part 24 overlaps the through-hole 42 of the base plate 30 in the axial direction. The through-hole 26 of the sandwiched part 24 is disposed to be close to the connection position of the sandwiched part 24 with the flat part 23. The size W23 (refer to FIG. 7) in the circumferential direction of an area where the flat part 23 connects to the sandwiched part 24 is greater than the diameter of the through-hole 26.

The plurality of top foil pieces 11 are arranged on the base plate 30 in the circumferential direction. A gap is provided between the top foil pieces 11 adjacent in the circumferential direction to separate them in the circumferential direction. Similarly, a gap is provided between the sandwiched parts 14 of the top foil pieces 11 adjacent in the circumferential direction to separate the sandwiched parts 14 in the circumferential direction. The sandwiched part 24 of the present disclosure extends to a position overlapping, in the axial direction, the gap between the sandwiched parts 14.

The size R14 in the radial direction of the sandwiched part 24 of the present disclosure is greater than the diameter of the through-hole 26. As shown in FIG. 4, the size R24 in the radial direction of the sandwiched part 24 may be approximately equal to a size in the radial direction from the inner peripheral surface to the outer peripheral surface of the bearing spacer 40 in order that the sandwiched part 24 contacts approximately the entire contact area of the bearing spacer 40. The sandwiched part 24 may have a circumferential length corresponding to about 60° out of 360° of the entire circumference of the bearing spacer 40. Thereby, the six back foil pieces 21 (the sandwiched parts 24) are sandwiched on approximately the entire circumference of the bearing spacer 40.

Next, the operation of the thrust foil bearing 3 having the above configuration will be described.

As shown in FIG. 2, the thrust foil bearings 3 are provided on two sides of the thrust collar 4 so that the thrust collar 4 is disposed therebetween. Therefore, the movement of the rotary shaft 1 in two different directions parallel to the thrust direction (the axial direction) can be limited.

In this state, when the rotary shaft 1 rotates to start the thrust collar 4 rotating, while the thrust collar 4 and the top foil piece 11 rub against each other, an ambient fluid is pushed into a wedge-shaped space formed therebetween. Then, when the rotational speed of the thrust collar 4 reaches a certain speed, a fluid lubrication film is formed therebetween. The pressure of the fluid lubrication film pushes the top foil piece 11 toward the back foil piece 21, and the thrust collar 4 breaks away from the contact state with the top foil piece 11 and starts rotating in non-contact.

As shown in FIG. 3, the top foil 10 of the present disclosure includes the slit 17 dividing the top foil 10 into an inner area and an outer area in the radial direction of the insertion hole 30a, the sandwiched part 14 disposed in the outer area than the slit 17, the extending part 13 extending from the sandwiched part 14 to the inner area than the slit 17, and the inclined part 12 being in the inner area, extending from the one side toward the other side in the circumferential direction of the insertion hole 30a with respect to the extending part 13, and inclined with respect to the flat surface of the base plate 30 extending a direction orthogonal to the axial direction of the insertion hole 30a.

In other words, the top foil 10 of this embodiment includes the slit 17 dividing the top foil 10 into an inner area and an outer area in the radial direction of the insertion hole 30a, the sandwiched part 14 disposed in the outer area, the extending part 13 extending from the sandwiched part 14 to the inner area, and the inclined part 12 being in the inner area, having an end on the one side in the circumferential direction of the insertion hole 30a connected to the extending part 13, extending from the extending part 13 toward the other side in the circumferential direction, and inclined with respect to the flat surface of the base plate 30 extending a direction orthogonal to the axial direction of the insertion hole. The extending part 13 extends from the sandwiched part 14 further inward in the radial direction than the slit 17.

According to this configuration, it is possible to provide a method of attaching the top foil 10 through sandwiching. That is, since the sandwiched part 14 is sandwiched, the top foil 10 can be attached to the base plate 30 without welding. Therefore, it is possible to prevent the top foil 10 (particularly, the inclined part 12) from deforming due to heat and to limit a deterioration in the load capacity of the thrust foil bearing 3 due to the distortion of the top foil 10. In addition, since the slit 17 separates the sandwiched part 14 (the outer area) from the inclined part 12 (the inner area), the inclined part 12 (the inner area) can deform as before (i.e., deformation by being pressed against the back foil 20 and the base plate 30).

Furthermore, even when the inclined part 12 is subjected to a frictional force by rubbing against the thrust collar 4 (before the fluid lubricating film is formed) or a frictional force by the fluid lubricating film during non-contact rotation, since the inclined part 12 is connected to the sandwiched part 14 through the extending part 13, the inclined part 12 is limited from moving from a fixed position.

In the present disclosure, the fastening bolt 41 attaching the bearing spacer 40 to the base plate 30 is provided, and the sandwiched part 14 is provided with the through-hole 16 through which the fastening bolt 41 is inserted. The sandwiched part 14 can be positioned by inserting the fastening bolt 41 through the through-hole 16, and thus the sandwiched part 14 can be easily sandwiched between the base plate 30 and the bearing spacer 40.

In the present disclosure, as shown in FIG. 5, the end part 12a on the other side in the circumferential direction of the inclined part 12 is the free end. Thereby, when a load acts on the inclined part 12, the end part 12a on the other side in the circumferential direction of the inclined part 12 can move toward the other side in the circumferential direction. That is, the inclined part 12 can deform by being pressed against the back foil 20 and the base plate 30 as before.

As shown in FIG. 4, the thrust foil bearing 3 of the present disclosure includes the base plate 30 provided with the insertion hole 30a through which the rotary shaft 1 is inserted, and the back foil 20 disposed around the insertion hole 30a, and the back foil 20 includes the sandwiched part 24 extending outward in the radial direction of the insertion hole 30a from the end part (the flat part 23), in the circumferential direction of the insertion hole 30a, of the back foil 20.

According to this configuration, it is possible to provide a method of attaching the back foil 20 through sandwiching. That is, the back foil 20 can be attached to the base plate 30 through the sandwiched part 24 without welding. Therefore, it is possible to prevent the back foil 20 (particularly, the support 22) from deforming due to heat. Consequently, the distortion of the top foil 10 (particularly, the inclined part 12) supported by the back foil 20 can be limited. Since the sandwiched part 24 is sandwiched, the back foil 20 is limited from moving from a fixed position.

In the present disclosure, the bearing spacer 40 is attached to the base plate 30, and the sandwiched parts 14 and 24 are sandwiched between the base plate 30 and the bearing spacer 40. Thereby, the back foil 20 can be sandwiched together with the top foil 10 by using the bearing spacer 40 that secures a space between the base plates 30 of the pair of thrust foil bearings 3.

In the present disclosure, the fastening bolt 41 attaching the bearing spacer 40 to the base plate 30 is provided, and the sandwiched part 24 may be provided with the through-hole 26 through which the fastening bolt 41 is inserted. The sandwiched part 24 can be positioned by inserting the fastening bolt 41 through the through-hole 26, and thus the sandwiched part 24 can be easily sandwiched between the base plate 30 and the bearing spacer 40.

In the present disclosure, as shown in FIG. 5, the back foil 20 includes the support 22 in which the hill parts 22a and the valley parts 22b are alternately formed, and the flat part 23 extending in the circumferential direction from the valley part 22b disposed at the end part of the support 22, and the sandwiched part 24 is connected to the flat part 23. Thereby, since the support 22 is connected to the sandwiched part 24 through the flat part 23, the support 22 subjected to a pressing load from the inclined part 12 can be limited from moving from a fixed position.

In the present disclosure, the end part 23a in the circumferential direction of the flat part 23 is provided with the bent part 25 that bends toward the base plate 30. Thereby, the rigidity (second moment of area) of the flat part 23 against bending in the radial direction can be increased. Therefore, in the support 22 having a radially outer side cantilevered by the flat part 23, the lifting on the radially inner side of the support 22 can be limited.

In the present disclosure, the base plate 30 is provided with the insertion groove 31 into which the bent part 25 is inserted. Thereby, when the support 22 is pressed against the base plate 30 by the inclined part 12, the bent part 15 comes into contact with the side wall surface on the other side in the circumferential direction of the insertion groove 31, whereby the movement of the back foil piece 21 (the support 22) toward the other side in the circumferential direction can be limited, and the back foil end 21a that is the free end can be moved toward the one side in the circumferential direction.

Second Embodiment

Next, a second embodiment of the present disclosure will be described. In the following description, the same or equivalent components as or to those of the above-described embodiment will be represented by equal reference signs, and the descriptions thereof will be simplified or omitted.

Figure 9:
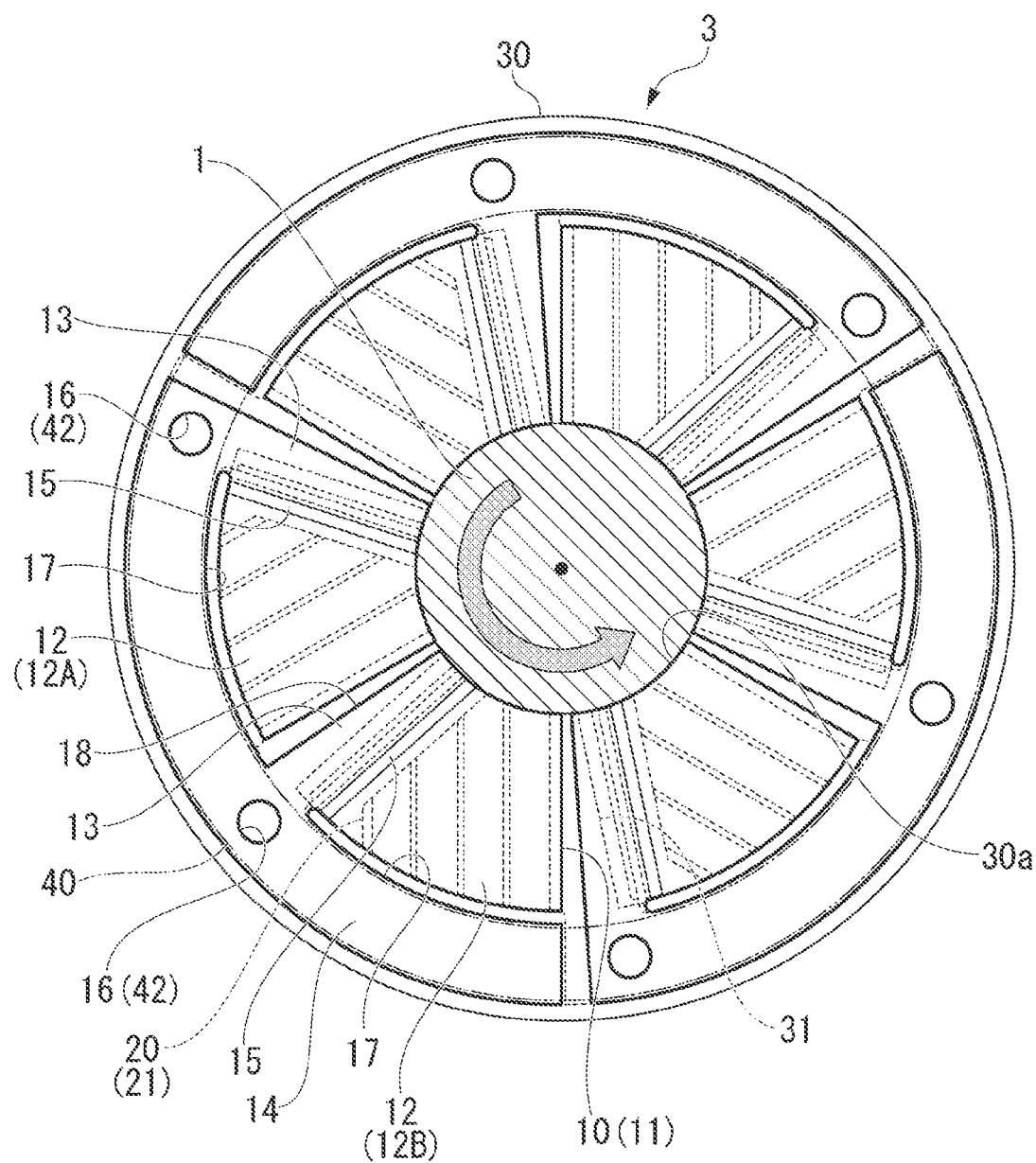
FIG. 9 is a plan view showing a thrust foil bearing of a second embodiment of the present disclosure.
Figure 10:
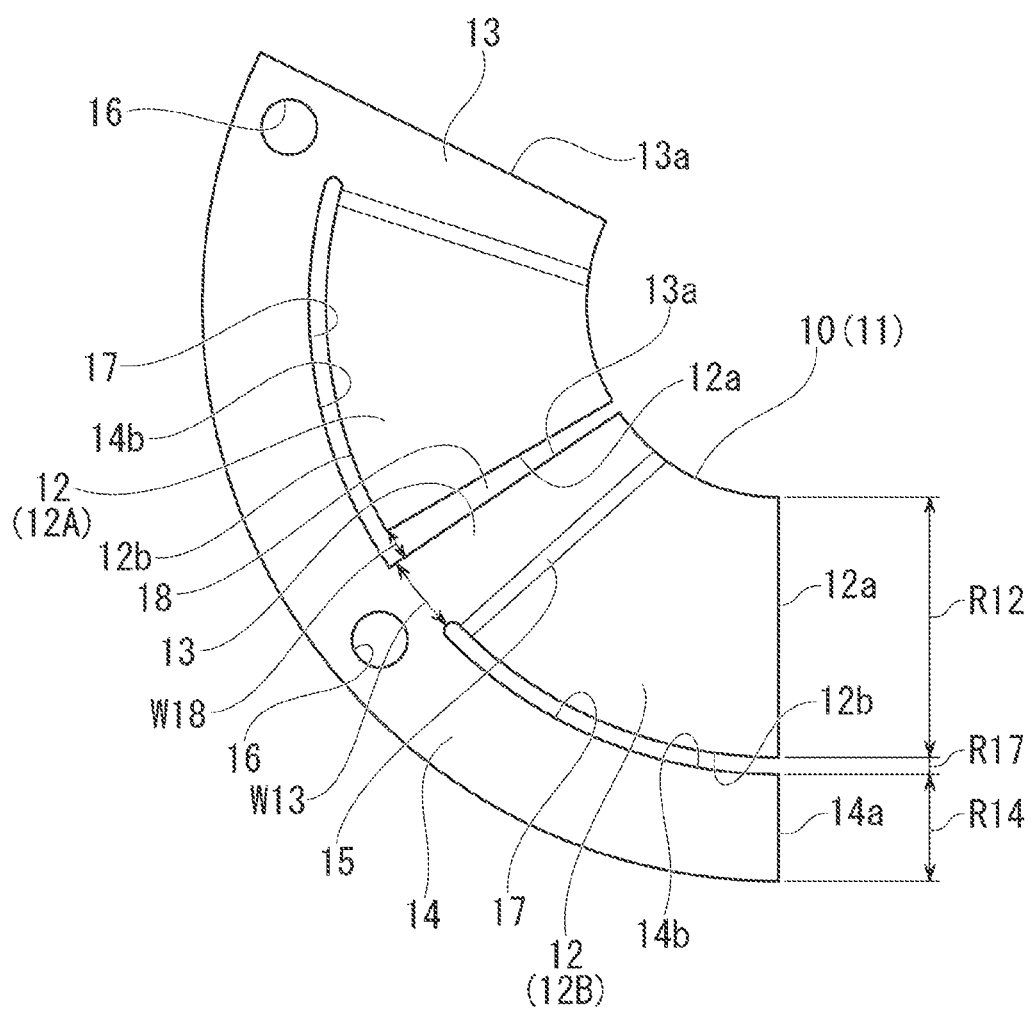
FIG. 10 is a plan view showing a top foil piece provided in the thrust foil bearing shown in FIG. 9.
Figure 11:
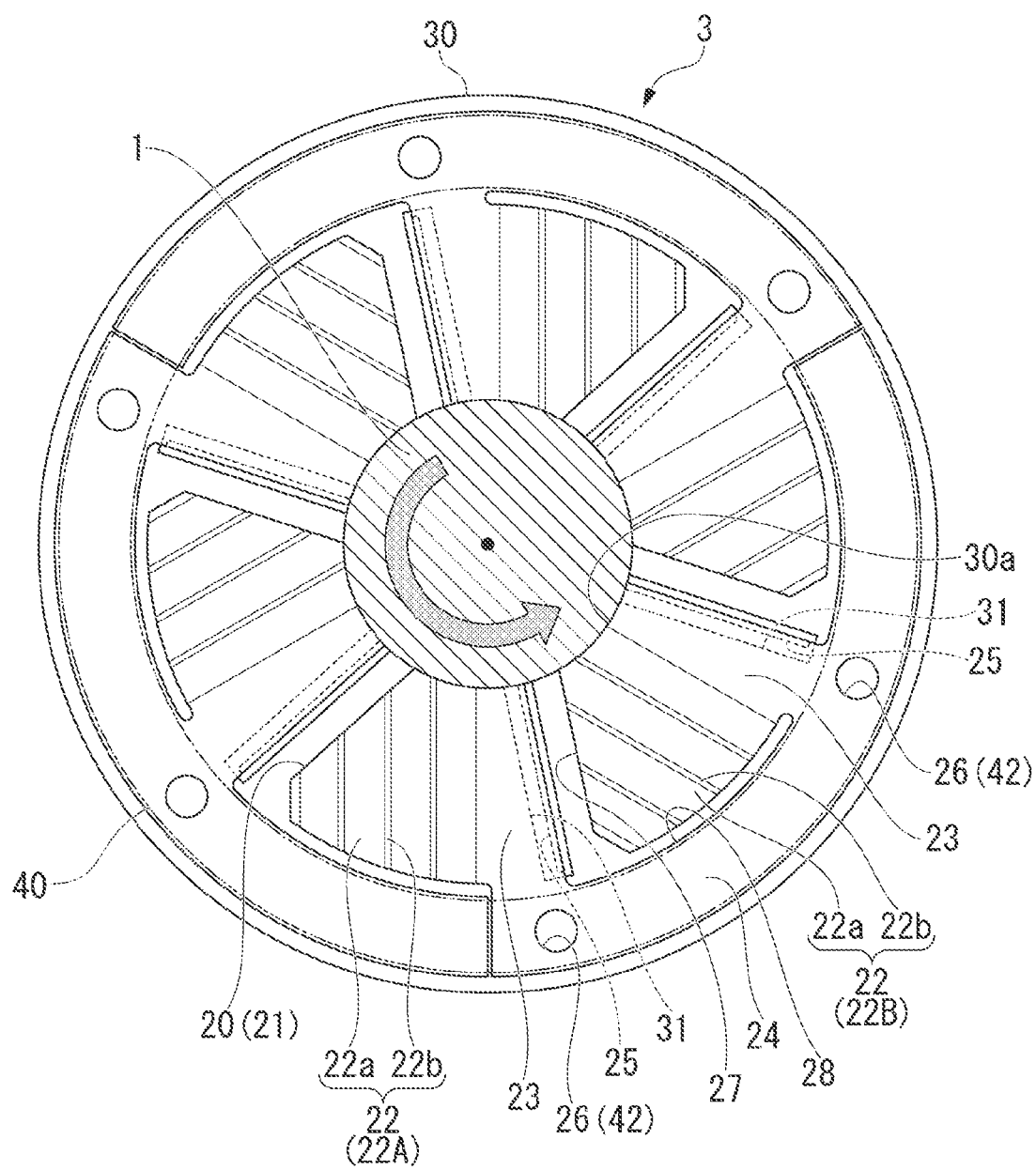
FIG. 11 is a plan view showing a state in which a top foil is removed from the thrust foil bearing shown in FIG. 9.
Figure 12:
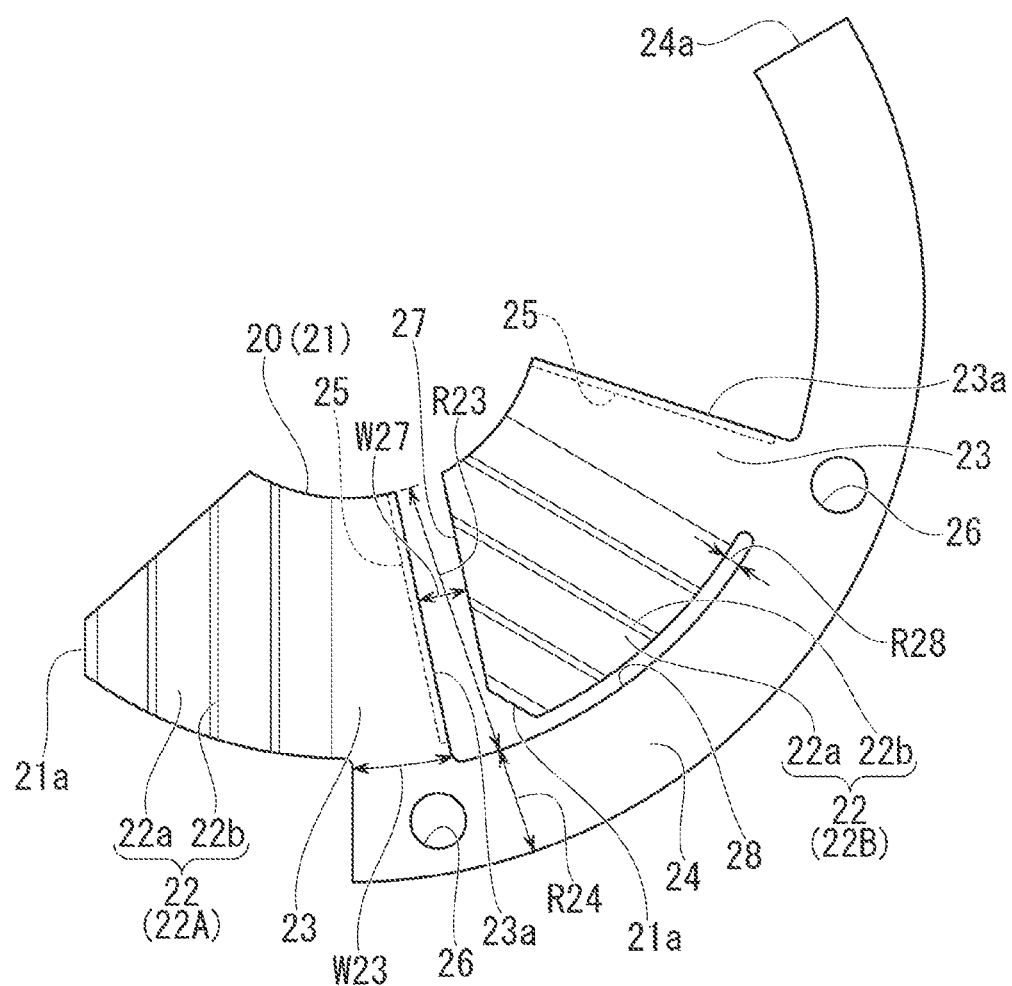
FIG. 12 is a plan view showing a back foil piece provided in the thrust foil bearing shown in FIG. 9.

FIG. 9 is a plan view showing a thrust foil bearing 3 of the second embodiment of the present disclosure. FIG. 10 is a plan view showing a top foil piece 11 provided in the thrust foil bearing 3 shown in FIG. 9. FIG. 11 is a plan view showing a state in which a top foil 10 is removed from the thrust foil bearing 3 shown in FIG. 9. FIG. 12 is a plan view showing a back foil piece 21 provided in the thrust foil bearing 3 shown in FIG. 9.

As shown in these drawings, the second embodiment has a configuration in which two top foil pieces 11 of the first embodiment are combined, and two back foil pieces 21 thereof are combined. That is, the top foil 10 is formed of three top foil pieces 11, and the back foil 20 is formed of three back foil pieces 21.

As shown in FIG. 10, a sandwiched part 14 of the top foil piece 11 is connected with two inclined parts 12 through extending parts 13. An inclined part 12A of the two inclined parts 12 disposed on the one side in the circumferential direction is connected to an end part on the one side in the circumferential direction of the sandwiched part 14 through an extending part 13. An inclined part 12B of the two inclined parts 12 disposed on the other side in the circumferential direction is connected to an intermediate position in the circumferential direction of the sandwiched part 14 through another extending part 13.

An end part 12a on the other side in the circumferential direction of the inclined part 12A is separated in the circumferential direction from an end part 13a on the one side in the circumferential direction of the extending part 13 connected with the inclined part 12B. That is, a second slit 18 is provided between the inclined part 12A and the extending part 13 connected with the inclined part 12B. The size W18 in the circumferential direction of the second slit 18 of the present disclosure gradually increases outward in the radial direction. The greatest size W18 in the circumferential direction of the second slit 18 of the present disclosure is less than the diameter of the through-hole 16 and is greater than the size R17 in the radial direction of the slit 17. The size of the second slit 18 described above is an example and does not have to necessarily have the above-described sizeal relationship.

That is, the top foil 10 is provided with the second slit 18.

The second slit 18 extends from the radially inner side to the radially outer side along the end part 12a on the other side in the circumferential direction of the inclined part 12A, and an end part on the radially outer side of the second slit 18 is connected to the slit 17. That is, the slit 17 and the second slit 18 (in other words, a bent slit) connected into an L-shape in a plan view are disposed around the inclined part 12A. Therefore, the inclined part 12A can be separated from the sandwiched part 14 adjacent thereto in the radial direction and the extending part 13 adjacent thereto in the circumferential direction and can be prevented from being caught thereby.

The sandwiched part 14 is provided with two through-holes 16. The two through-holes 16 are disposed to be close to the connection positions of the sandwiched part 14 with the two extending parts 13. The sandwiched part 14 has a circumferential length corresponding to about 120° (about ⅓ of the entire circumference) out of 360° of the entire circumference of the bearing spacer 40. Thereby, the three top foil pieces 11 (the sandwiched parts 14) are sandwiched by approximately the entire circumference of the bearing spacer 40.

As shown in FIG. 11, the back foil 20 is formed of the three back foil pieces 21 arranged in the circumferential direction. A sandwiched part 24 of the back foil piece 21 is connected with two supports 22 through flat parts 23. A support 22A of the two supports 22 disposed on the one side in the circumferential direction is connected to an end part on the one side in the circumferential direction of the sandwiched part 24 through a flat part 23. A support 22B of the two supports 22 disposed on the other side in the circumferential direction is connected to an intermediate position in the circumferential direction of the sandwiched part 24 through another flat part 23.

As shown in FIG. 12, an end part 23a on the other side in the circumferential direction of the flat part 23 connected with the support 22A is separated in the circumferential direction from an end part on the one side in the circumferential direction of the support 22B and a back foil end 21a of the support 22B. That is, a first slit 27 is provided between the support 22B and the flat part 23 connected with the support 22A. In the present disclosure, the size W27 in the circumferential direction of the first slit 27 is constant and is less than the diameter of the through-hole 16. The size of the first slit 27 described above is an example and does not have to necessarily have the above-described sizeal relationship.

The first slit 27 extends from the radially inner side to the radially outer side along the end part 23a on the other side in the circumferential direction of the flat part 23 connected with the support 22A, and an end part on the radially outer side of the first slit 27 is connected to a second slit 28. The second slit 28 separates, in the radial direction, an end part on the radially outer side of the support 22B from an end part on the radially inner side of the sandwiched part 24. The second slit 28 extends from the connection position with the first slit 27 toward the other side in the circumferential direction.

The size R28 in the radial direction of the second slit 28 is approximately equal to the size R17 (refer to FIG. 10) in the radial direction of the slit 17 of the top foil 10 described above. That is, the first slit 27 and the second slit 28 connected into an L-shape in a plan view are disposed around the support 22B. Therefore, the support 22B can be separated from the sandwiched part 14 adjacent thereto in the radial direction and the flat part 23 adjacent thereto in the circumferential direction and can be prevented from being caught thereby.

The sandwiched part 24 is provided with two through-holes 16. The two through-holes 16 are disposed to be close to the connection positions of the sandwiched part 24 with the two flat parts 23. The sandwiched part 24 has a circumferential length corresponding to about 120° (about ⅓ of the entire circumference) out of 360° of the entire circumference of the bearing spacer 40. Thereby, the three back foil pieces 21 (the sandwiched parts 24) are sandwiched by approximately the entire circumference of the bearing spacer 40.

According to the thrust foil bearing 3 having the above configuration, similarly to the above-described first embodiment, the top foil piece 11 and the back foil piece 21 can be attached to the base plate 30 through sandwiching at the sandwiched parts 14 and 24 without welding.

Therefore, it is possible to limit the top foil 10 from distorting and to limit the load capacity of the thrust foil bearing 3 from deteriorating.

In the second embodiment, the sandwiched part 14 of the top foil piece 11 is connected with the plurality of inclined parts 12 through the extending parts 13, and the sandwiched part 24 of the back foil piece 21 is connected with the plurality of supports 22 through the flat parts 23. Therefore, as compared to the first embodiment, the numbers of the top foil pieces 11 and the back foil pieces 21 can be decreased, the number of parts can be decreased, and the assembly man-hours can also be reduced.

That is, the sandwiched part 14 of the top foil piece 11 is connected with a plurality of the inclined parts 12 through a plurality of the extending parts 13, and the sandwiched part 24 of the back foil piece 21 is connected with a plurality of the supports 22 through a plurality of the flat parts 23.

In the second embodiment, the sandwiched part 14 of the top foil piece 11 is provided with a plurality of the through-holes 16, and the sandwiched part 24 of the back foil piece 21 is provided with a plurality of the through-holes 26. The rotation of the top foil piece 11 and the back foil piece 21 around the fastening bolt 41 can be prevented by inserting the fastening bolts 41 through the plurality of through-holes 16 and the plurality of through-holes 26, and thus the positioning of the sandwiched parts 14 and 24 can be more easily performed.

Third Embodiment

Next, a third embodiment of the present disclosure will be described. In the following description, the same or equivalent components as or to those of the above-described embodiments will be represented by equal reference signs, and the descriptions thereof will be simplified or omitted.

Figure 13:
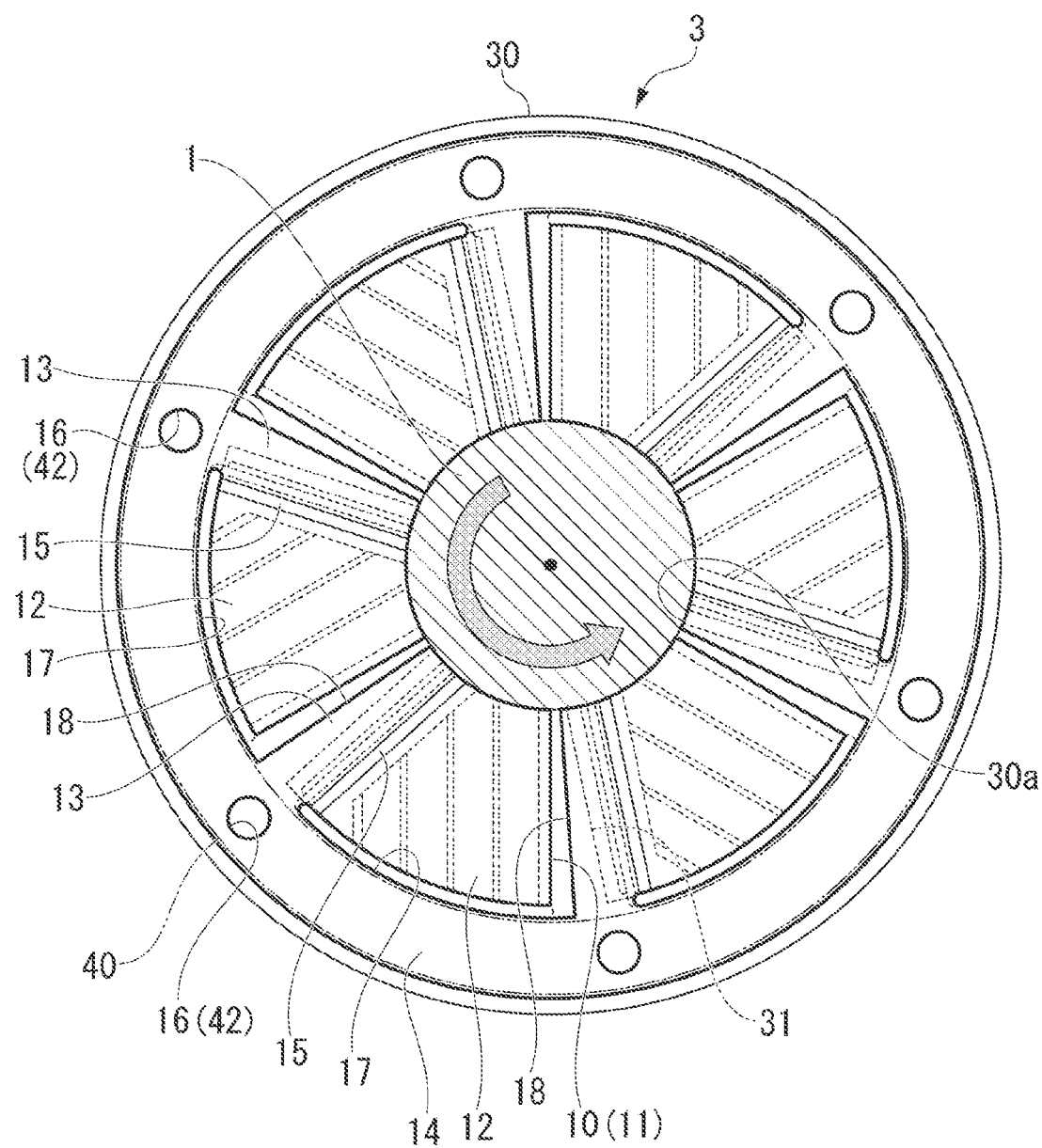
FIG. 13 is a plan view showing a thrust foil bearing of a third embodiment of the present disclosure.
Figure 14:
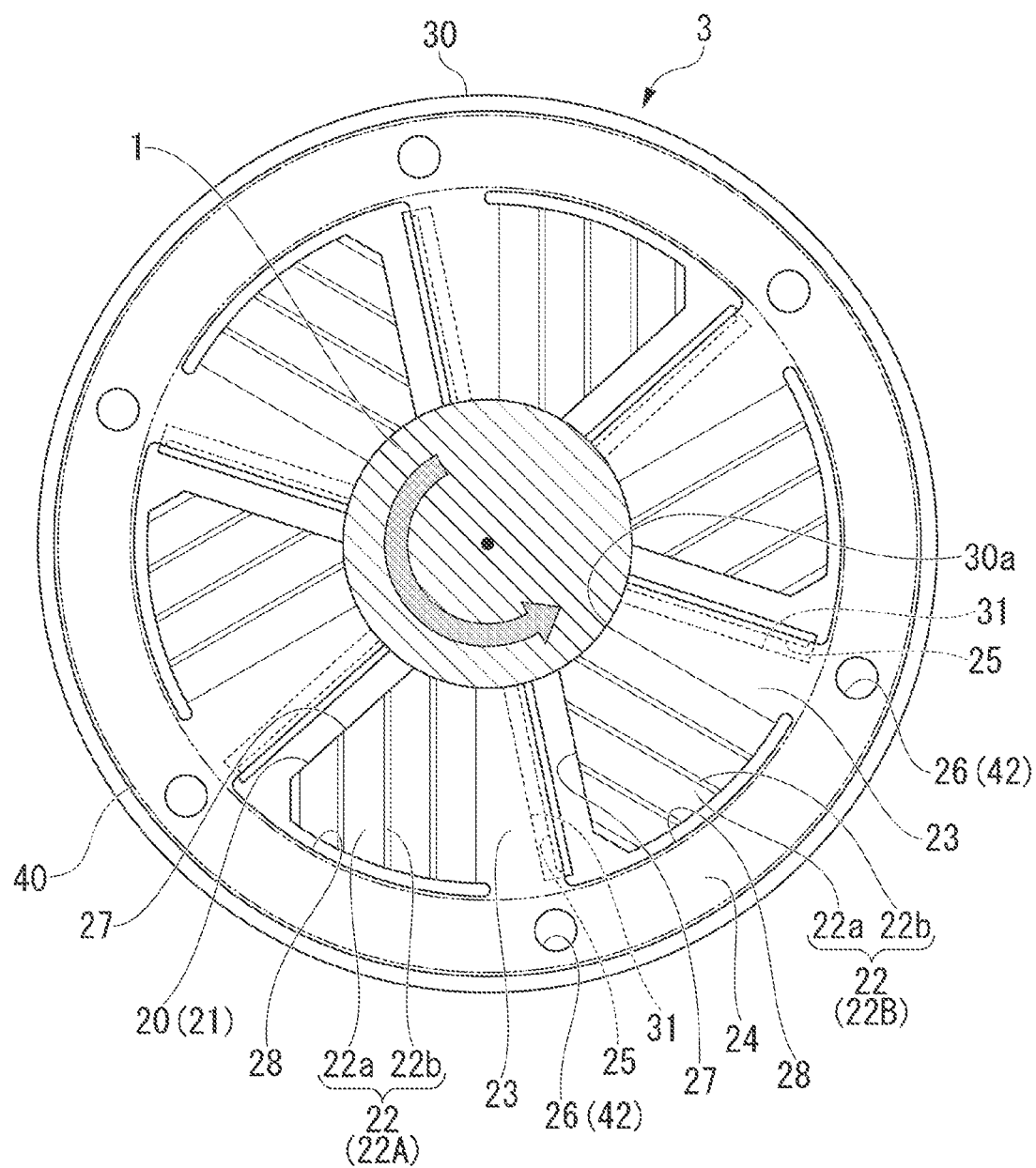
FIG. 14 is a plan view showing a state in which a top foil is removed from the thrust foil bearing shown in FIG. 13.

FIG. 13 is a plan view showing a thrust foil bearing 3 of the third embodiment of the present disclosure. FIG. 14 is a plan view showing a state in which a top foil 10 is removed from the thrust foil bearing 3 shown in FIG. 13.

As shown in these drawings, the third embodiment has a configuration in which the top foil pieces 11 of the above embodiment are combined, and the back foil pieces 21 thereof are combined. That is, the top foil 10 is formed of one foil (one top foil piece 11), and the back foil 20 is formed of one foil (one back foil piece 21).

As shown in FIG. 13, the top foil 10 includes six inclined parts 12. That is, a sandwiched part 14 of the top foil 10 is connected with the six inclined parts 12 through extending parts 13. The sandwiched part 14 is formed into an annular shape similar to the bearing spacer 40. The six inclined parts 12 are connected through the extending parts 13 to the sandwiched part 14 at intervals in the circumferential direction, and each interval corresponds to 60°. Each of the six inclined parts 12 is separated from the sandwiched part 14 adjacent thereto in the radial direction through the slit 17, is separated from the extending part 13 adjacent thereto in the circumferential direction through the second slit 18 and is configured not to be caught thereby. The sandwiched part 14 is provided with six through-holes 16 at intervals in the circumferential direction, and each interval corresponds to 60°.

As shown in FIG. 14, the back foil 20 includes six supports 22. That is, a sandwiched part 24 of the back foil 20 is connected with the six supports 22 through flat parts 23. The sandwiched part 24 is formed into an annular shape similar to the bearing spacer 40. The six supports 22 are connected through the flat parts 23 to the sandwiched part 24 at intervals in the circumferential direction, and each interval corresponds to 60°. Each of the six supports 22 is separated from the sandwiched part 24 adjacent thereto in the radial direction through the slit 17, is separated from the flat part 23 adjacent thereto in the circumferential direction through the second slit 18 and is configured not to be caught thereby. The sandwiched part 24 is provided with six through-holes 26 at intervals in the circumferential direction, and each interval corresponds to 60°.

According to the thrust foil bearing 3 having the above configuration, similarly to the above-described embodiments, the top foil 10 and the back foil 20 can be attached to the base plate 30 through sandwiching at the sandwiched parts 14 and 24 without welding.

Therefore, it is possible to limit the top foil 10 from distorting and to limit the load capacity of the thrust foil bearing 3 from deteriorating.

In the third embodiment, the sandwiched parts 14 and 24 are formed into annular shapes. Therefore, the sandwiched parts 14 and 24 can be sandwiched by the bearing spacer 40 on the entire circumference thereof. Since the sandwiched parts 14 and 24 are formed into annular shapes, each of the top foil 10 and the back foil 20 is made into one foil, so that the number of parts can be decreased and the assembly man-hours can also be reduced.

Fourth Embodiment

Next, a fourth embodiment of the present disclosure will be described. In the following description, the same or equivalent components as or to those of the above-described embodiments will be represented by equal reference signs, and the descriptions thereof will be simplified or omitted.

Figure 15:
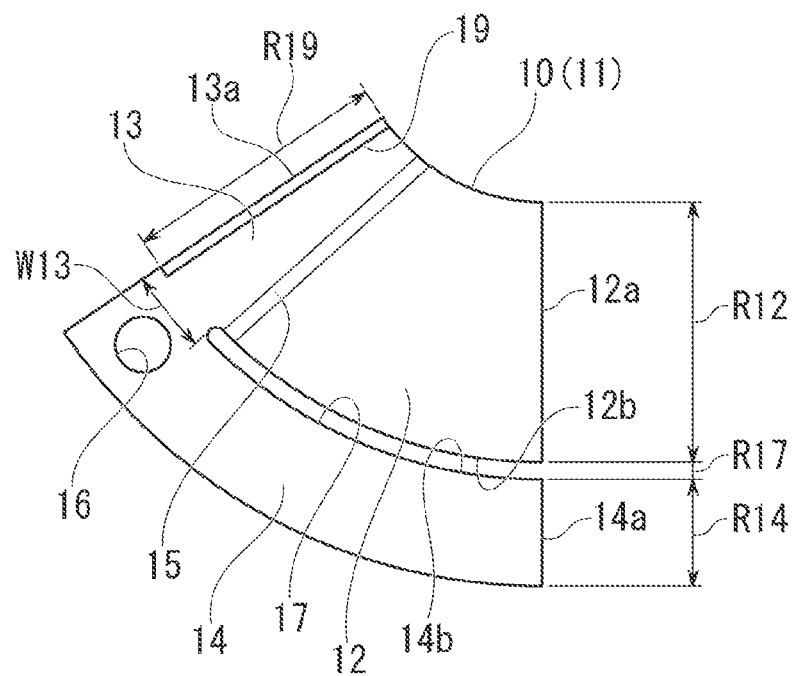
FIG. 15 is a plan view showing a top foil of a fourth embodiment of the present disclosure.
Figure 16:
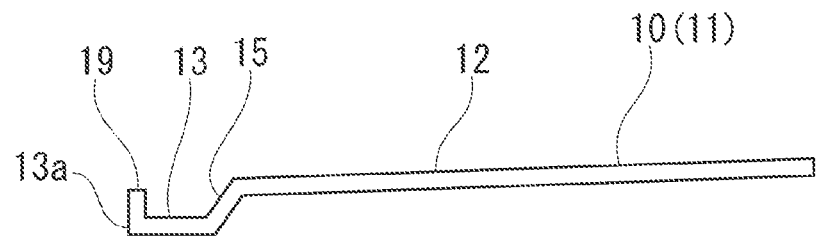
FIG. 16 is a cross-sectional view in the circumferential direction and through an inclined part and an extending part of the top foil shown in FIG. 15.

FIG. 15 is a plan view showing a top foil 10 of the fourth embodiment of the present disclosure. FIG. 16 is a cross-sectional view in the circumferential direction and through an inclined part 12 and an extending part 13 of the top foil 10 shown in FIG. 15. As shown in these drawings, in the fourth embodiment, an end part 13a on the one side in the circumferential direction of the extending part 13 of the top foil 10 is provided with a bent part 19 that bends toward a distant side from a base plate 30.

As shown in FIG. 16, the bent part 19 is bent at an approximately right angle toward the distant side (upper side in FIG. 16) from the base plate 30. The axial position of the tip of the bent part 19 is positioned below (to be closer to the base plate 30 than) the axial position of an end part on the one side in the circumferential direction of the inclined part 12. As shown in FIG. 15, the bending line of the bent part 19 extends linearly in the radial direction. That is, the bending line of the bent part 19 extends in parallel to the end part 13a on the one side in the circumferential direction of the extending part 13.

The size R19 in the radial direction of the bent part 19 is approximately the same as the size R12 in the radial direction of the inclined part 12. The size R19 in the radial direction of the bent part 19 may be greater than the size R12 in the radial direction of the inclined part 12. That is, the size R19 in the radial direction of the bent part 19 may be a length obtained by adding the size R12 in the radial direction of the inclined part 12 and the size R17 in the radial direction of the slit 17. Thereby, the bent part 19 extends to the connection part (neck part) between the extending part 13 and the sandwiched part 14.

According to the top foil 10 having the above configuration, since the bent part 19 bending toward the distant side from the base plate 30 is provided at the end part 13a on the one side in the circumferential direction of the extending part 13, the rigidity (second moment of area) of the extending part 13 against bending in the radial direction can be increased. Therefore, in the inclined part 12 having a radially outer side cantilevered by the extending part 13, the lifting on the radially inner side of the inclined part 12 can be limited.

That is, the inclination direction of the support 22 of the back foil 20 is a direction perpendicular to an end part on the other side in the circumferential direction of the support 22, but the inclination direction of the inclined part 12 of the top foil 10 is a direction perpendicular to an end part on the one side in the circumferential direction of the inclined part 12, and thus the inclination directions of these components are different. In addition, the inclined part 12 is provided in a state of being pressed against the support 22 in advance. Therefore, the radially inner side of the inclined part 12 contacts the support 22 before the radially outer side thereof contacts it, whereby the radially inner side of the inclined part 12 is pushed up by a force from the support 22, and the lifting of the radially inner side may easily occur. In addition, since the circumferential speed on the radially inner side of the thrust collar 4 is low, the pressure of the fluid lubricating film thereon is low, and the contact of the foil with the thrust collar 4 may easily occur. Therefore, by providing the bent part 19 in the inclined part 12, the support 22 on the radially inner side can be pushed in advance from the time the speed is zero, and thus the height thereof can be decreased.

Figure 17:
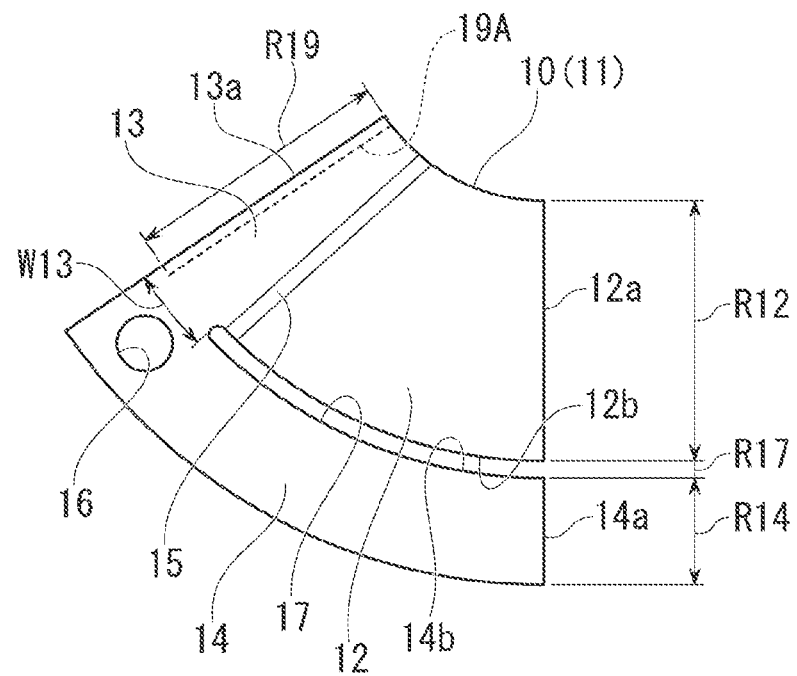
FIG. 17 is a plan view showing a top foil of a modification of the fourth embodiment of the present disclosure.
Figure 18:
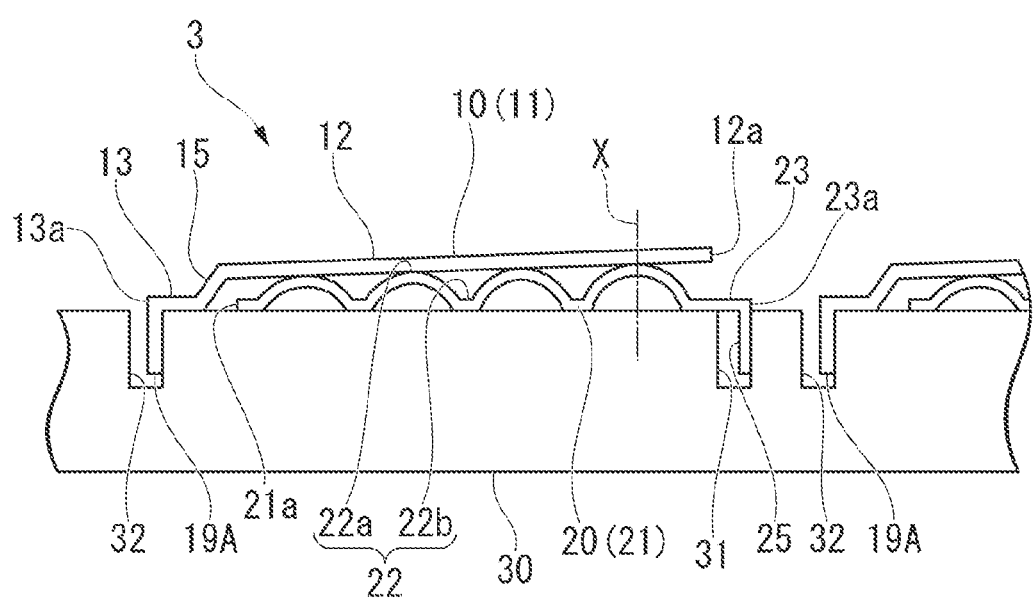
FIG. 18 is a cross-sectional view in the circumferential direction and through an inclined part and an extending part of the top foil shown in FIG. 17.

The fourth embodiment can adopt a modification as shown in FIGS. 17 and 18.

FIG. 17 is a plan view showing a top foil 10 of a modification of the fourth embodiment of the present disclosure. FIG. 18 is a cross-sectional view in the circumferential direction and through an inclined part 12 and an extending part 13 of the top foil 10 shown in FIG. 17.

As shown in these drawings, an end part 13a on the one side in the circumferential direction of the extending part 13 of the top foil 10 may be provided with a bent part 19A that bends towards the base plate 30.

As shown in FIG. 18, the bent part 19A is formed by bending the bent part 19 described above at an approximately right angle toward the base plate 30 (downward in FIG. 18). The base plate 30 is provided with an insertion groove 32 into which the bent part 19A of the top foil 10 is inserted. The insertion groove 32 is formed to be separated in the circumferential direction from the insertion groove 31 into which the bent part 25 of the back foil 20 is inserted. The bent part 19A inserted into the insertion groove 32 can come into contact with a side wall surface on the other side in the circumferential direction of the insertion groove 32.

According to the top foil 10 having the above configuration, similarly to the bent part 19 described above, the rigidity (second moment of area) of the extending part 13 against bending in the radial direction can be increased by the bent part 19A that bends toward the base plate 30. Therefore, in the inclined part 12 having a radially outer side cantilevered by the extending part 13, the lifting on the radially inner side of the inclined part 12 can be limited.

In this modification, the base plate 30 is provided with the insertion groove 32 into which the bent part 19A is inserted. Thereby, when the inclined part 12 is pressed against the base plate 30, the bent part 19A contacts the side wall surface on the other side in the circumferential direction of the insertion groove 32, whereby the top foil 10 (the inclined part 12) can be prevented from moving toward the other side in the circumferential direction.

Fifth Embodiment

Next, a fifth embodiment of the present disclosure will be described. In the following description, the same or equivalent components as or to those of the above-described embodiments will be represented by equal reference signs, and the descriptions thereof will be simplified or omitted.

Figure 19:
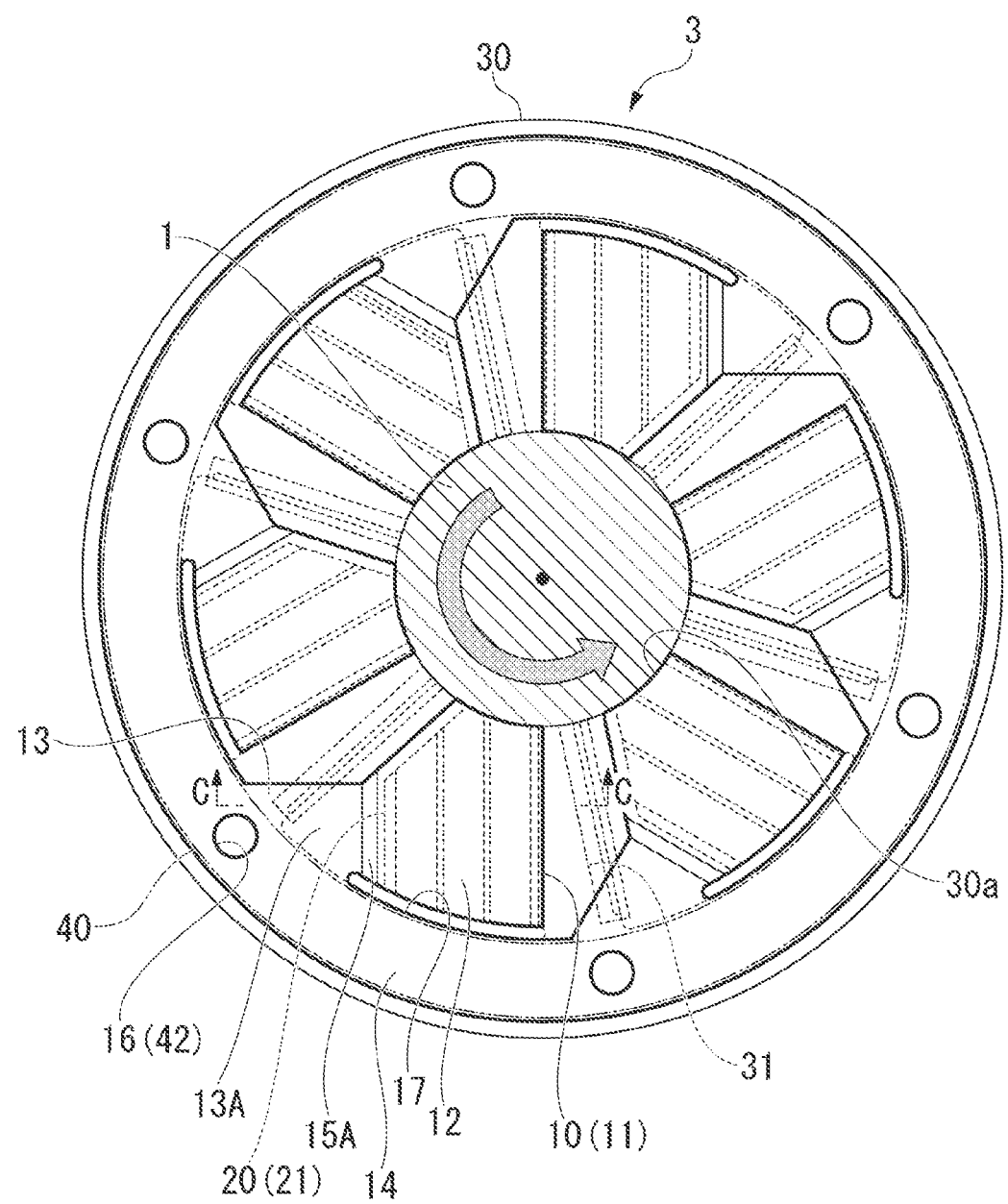
FIG. 19 is a plan view showing a thrust foil bearing of a fifth embodiment of the present disclosure.
Figure 20:
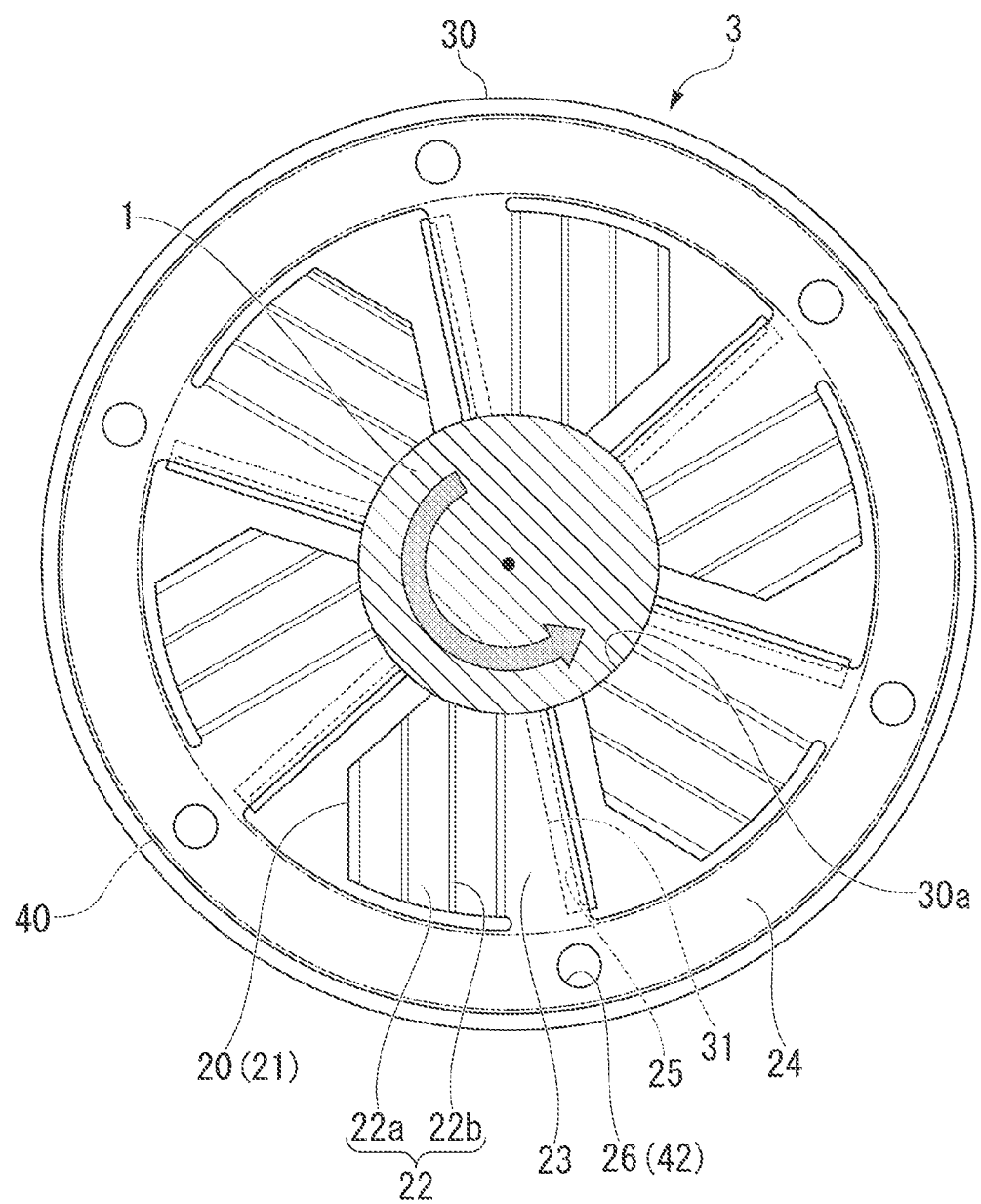
FIG. 20 is a plan view showing a state in which a top foil is removed from the thrust foil bearing shown in FIG. 19.
Figure 21:
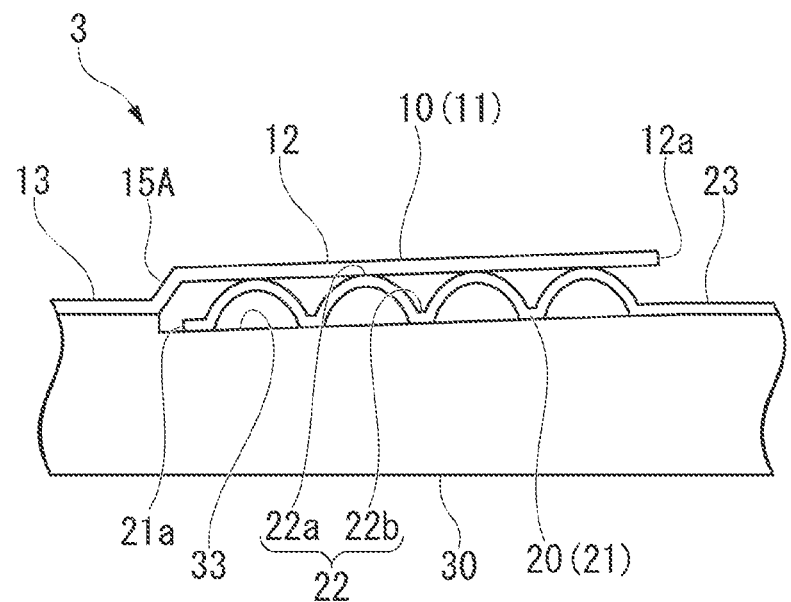
FIG. 21 is a cross-sectional view taken along line C-C and viewed in an arrow direction in FIG. 19.

FIG. 19 is a plan view showing a thrust foil bearing 3 of the fifth embodiment of the present disclosure. FIG. 20 is a plan view showing a state in which a top foil 10 is removed from the thrust foil bearing 3 shown in FIG. 19. FIG. 21 is a cross-sectional view taken along line C-C and viewed in an arrow direction in FIG. 19.

As shown in these drawings, in the fifth embodiment, the inclination direction of an inclined part 12 of the top foil 10 and the inclination direction of a support 22 of a back foil 20 are equal. Similarly to the third embodiment described above, each of the top foil 10 and the back foil 20 is formed of one foil (one top foil piece 11 and one back foil piece 21, respectively).

As shown in FIG. 21, a portion of a base plate 30, on which the support 22 of the back foil 20 is disposed, is provided with an inclined surface 33. The inclined surface 33 is formed to have a height gradually decreasing toward the back foil end 21a. On the other hand, the hill parts 22a of the support 22 are formed to have a constant height. Therefore, the inclined part 12 of the top foil 10 that is supported by the support 22 disposed on the inclined surface 33 is parallel to the inclined surface 33 but is inclined at an initial inclination angle to be gradually distant from the flat surface of the base plate 30. That is, the inclined part 12 is parallel to the inclined surface 33 but is inclined with respect to the flat surface of the base plate 30 orthogonal to the axial direction.

As shown in FIG. 19, an end part (a bent part 15A) on the other side in the circumferential direction of the inclined part 12 of the top foil 10 extends in parallel to the back foil end 21a of the back foil 20. The inclination direction of the inclined part 12 is a direction perpendicular to the bent part 15A (the back foil end 21a) and thus is equal to the inclination direction of the support 22 of the back foil 20. An extending part 13A of the top foil 10 is formed into an approximately right-angled triangular shape in the plan view shown in FIG. 19 in order to connect the bent part 15A to the sandwiched part 14. The back foil 20 shown in FIG. 20 has the same configuration as the back foil 20 of the third embodiment described above.

According to the thrust foil bearing 3 having the above configuration, since the inclination direction of the support 22 of the back foil 20 and the inclination direction of the inclined part 12 of the top foil 10 are equal, the radially inner side of the inclined part 12 does not contact the support 22 before the radially outer side thereof contacts it, and thus the lifting on the radially inner side of the inclined part 12 does not easily occur.

Figure 22:
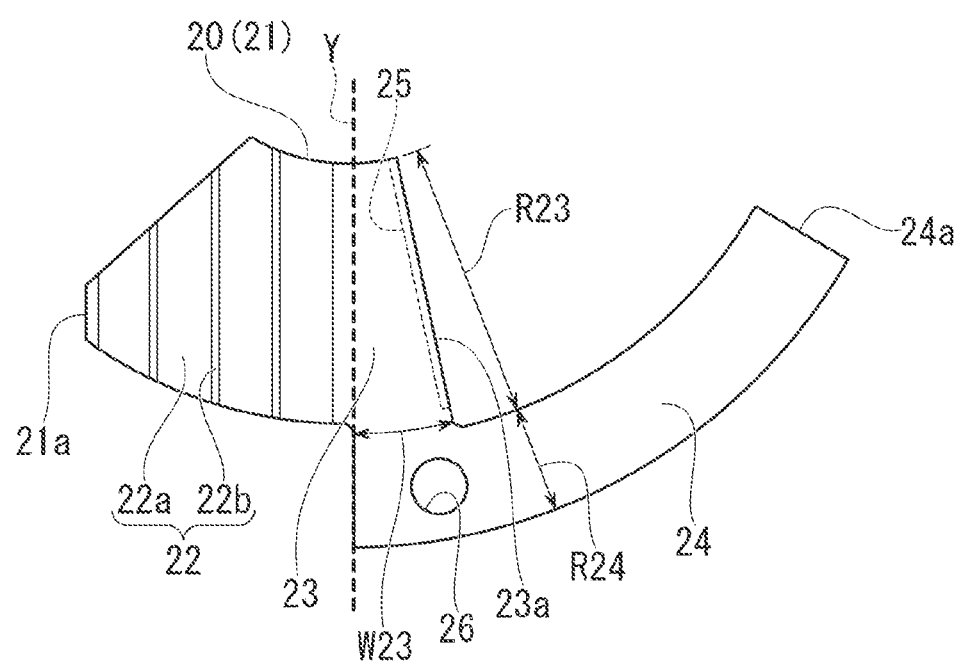
FIG. 22 is a plan view showing a back foil of a modification of the fifth embodiment of the present disclosure.
Figure 23:
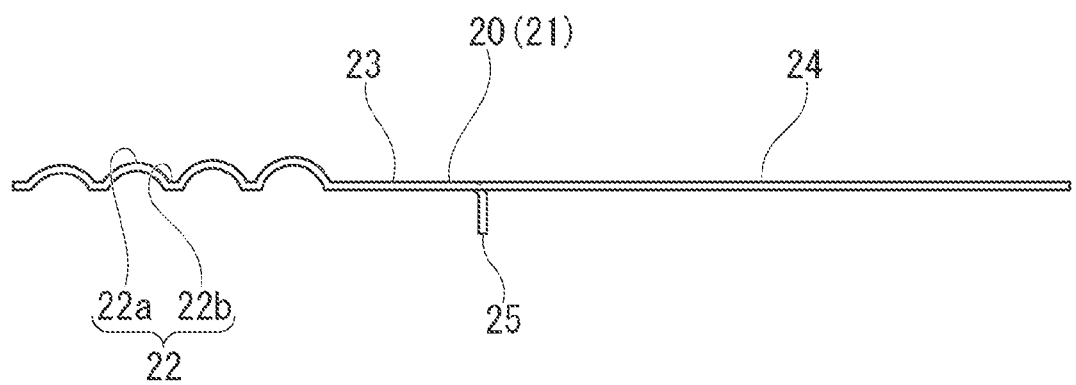
FIG. 23 is a side view of a back foil of another modification of the fifth embodiment of the present disclosure.

The fifth embodiment can adopt a modification as shown in FIGS. 22 and 23.

FIG. 22 is a plan view showing a back foil 20 of a modification of the fifth embodiment of the present disclosure. FIG. 23 is a side view of a back foil 20 of another modification of the fifth embodiment of the present disclosure.

As shown in these drawings, a configuration may be used in which the back foil 20 is formed of a plurality of back foil pieces 21 similar to the first embodiment.

In the back foil piece 21 shown in FIG. 22, the connection part between the support 22 and the flat part 23 is provided with a bending line Y extending in the radial direction. The hill parts 22a of the support 22 have a constant height and are disposed on the inclined surface 33 described above.

On the other hand, the height of hill parts 22a of a support 22 of the back foil piece 21 shown in FIG. 23 gradually increases from the back foil end 21a toward the end part on the other side in the circumferential direction of the support 22. This support 22 is supported by the flat surface of the base plate 30.

Each back foil piece 21 of FIGS. 22 and 23 is provided with the bent part 25.

Sixth Embodiment

Next, a sixth embodiment of the present disclosure will be described. In the following description, the same or equivalent components as or to those of the above-described embodiments will be represented by equal reference signs, and the descriptions thereof will be simplified or omitted.

Figure 24:
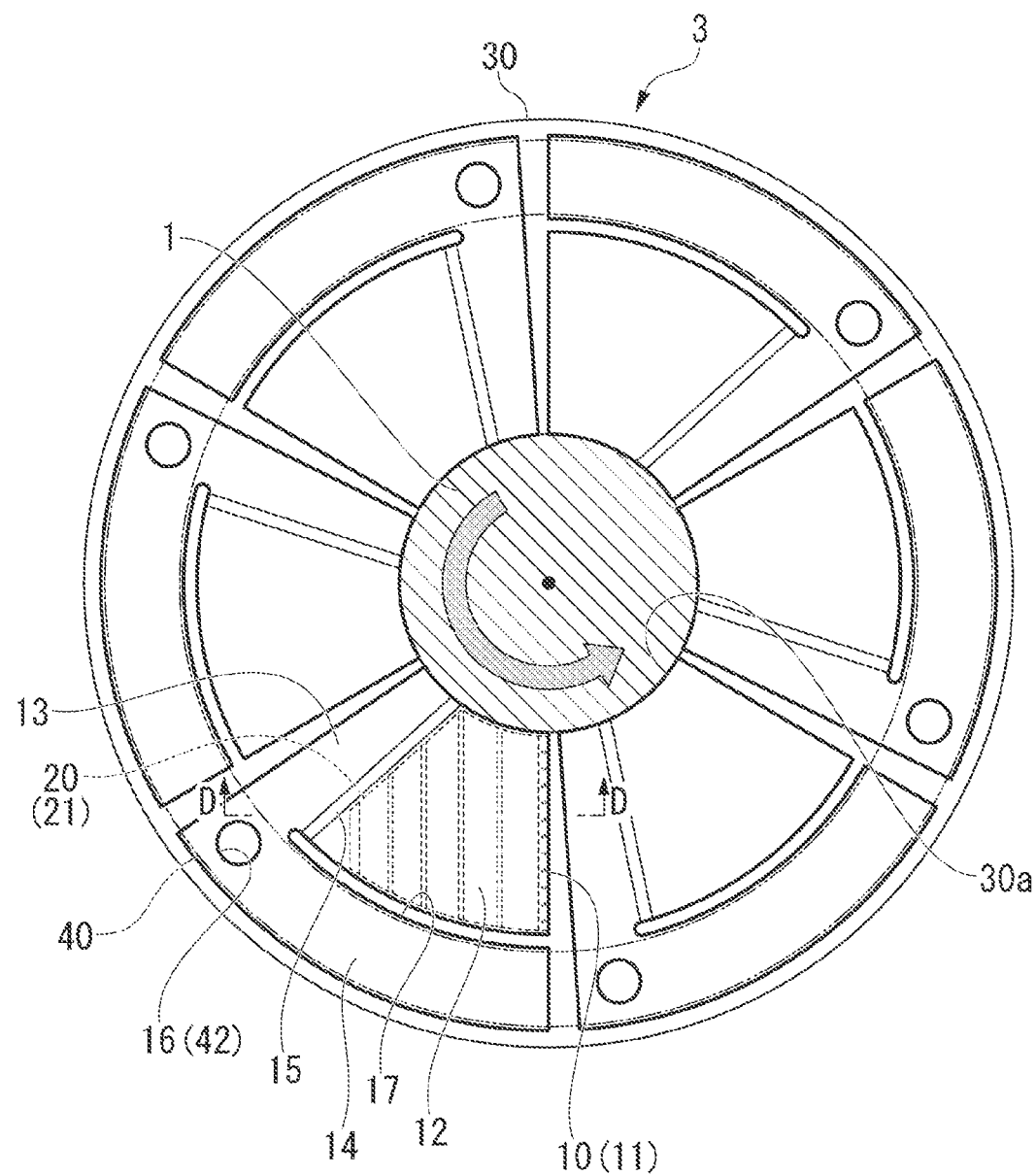
FIG. 24 is a plan view showing a thrust foil bearing of a sixth embodiment of the present disclosure.
Figure 25:
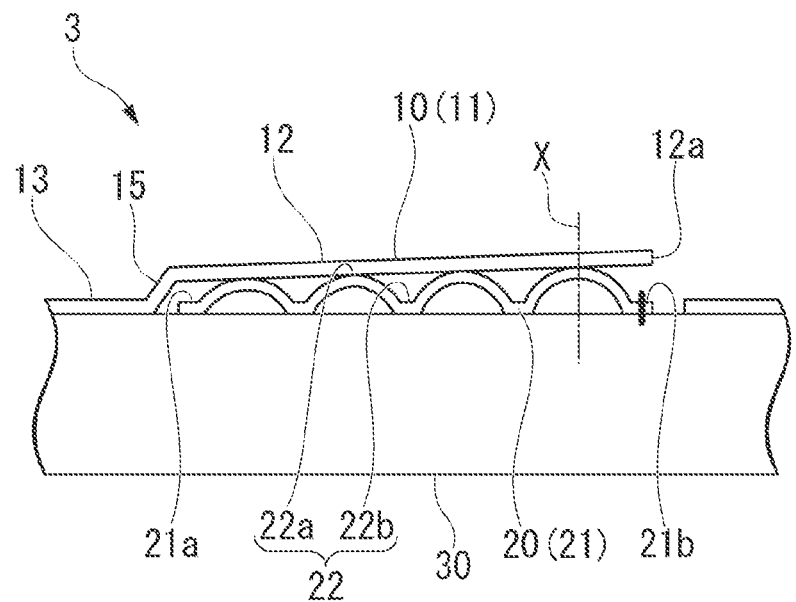
FIG. 25 is a cross-sectional view taken along line D-D and viewed in an arrow direction in FIG. 24.

FIG. 24 is a plan view showing a thrust foil bearing 3 of the sixth embodiment of the present disclosure. FIG. 25 is a cross-sectional view taken along line D-D and viewed in an arrow direction in FIG. 24.

As shown in these drawings, in the sixth embodiment, the top foil 10 is provided with the sandwiched part 14, but a back foil 20 is provided with no sandwiched part 24, and a back foil piece 21 is formed only of the support 22.

As shown in FIG. 25, an end part 21b on the other side in the circumferential direction of the back foil piece 21 is spot-welded to the base plate 30. That is, this welding position is equal to the attachment position of the back foil piece 21 to the base plate 30. The attachment position of the back foil piece 21 is at the valley part 22b. In the present disclosure, the attachment position of the back foil piece 21 is at the valley part 22b that is disposed to be closest to the other side in the circumferential direction.

An end part (a back foil end 21a) on the one side in the circumferential direction of the back foil piece 21 is a free end. That is, when a load acts on the back foil piece 21, the back foil end 21a on the one side in the circumferential direction can move toward the one side in the circumferential direction. The back foil piece 21 can be attached to the base plate 30 by, for example, screwing besides spot-welding.

Hereinbefore, the embodiments of the present disclosure have been described with reference to the drawings, but the present disclosure is not limited to the above embodiments. The various shapes, combinations and the like of the components shown in the above-described embodiments are examples, and various modifications can be adopted based on design requirements and the like within the scope of the present disclosure.

For example, the following modifications can be considered. In the following description, the same or equivalent components as or to those of the above-described embodiments will be represented by equal reference signs, and the descriptions thereof will be simplified or omitted.

Figure 26:
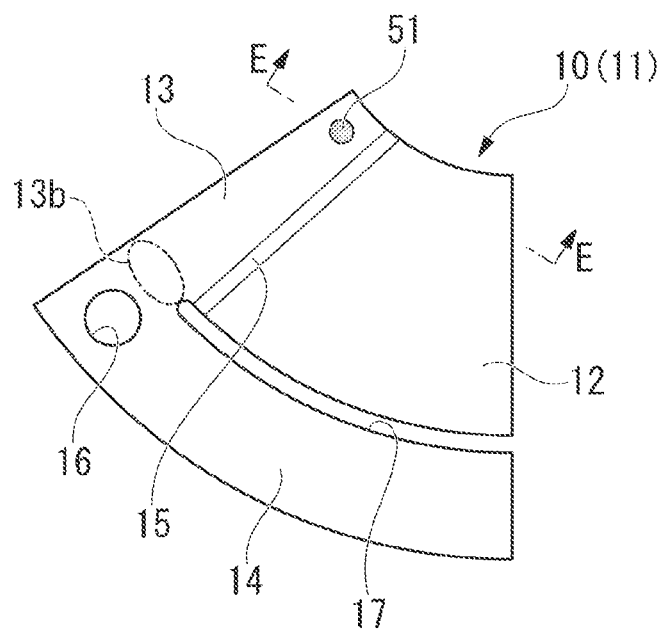
FIG. 26 is a plan view showing a top foil of a thrust foil bearing of a first modification of the first embodiment of the present disclosure.
Figure 27:
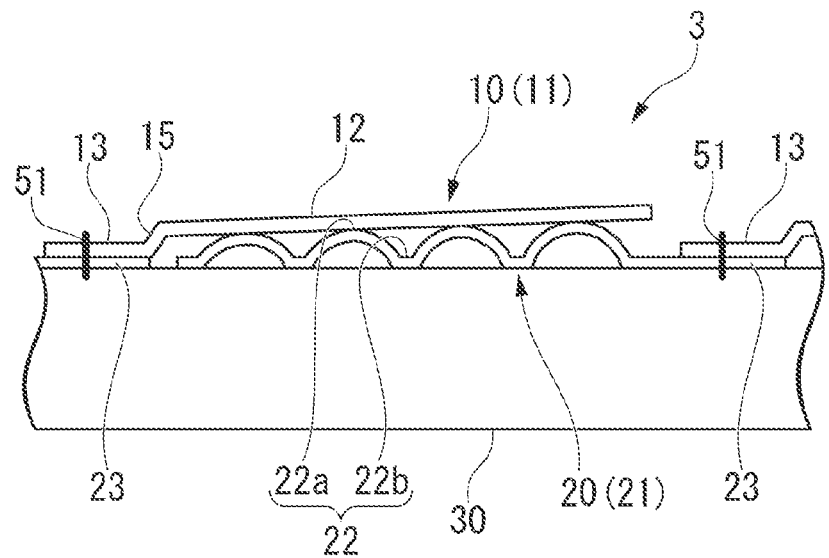
FIG. 27 is a cross-sectional view taken along line E-E and viewed in an arrow direction in FIG. 26.

FIG. 26 is a plan view showing a top foil 10 of a thrust foil bearing 3 of a first modification of the above first embodiment. FIG. 27 is a cross-sectional view taken along line E-E and viewed in an arrow direction in FIG. 26.

As shown in FIGS. 26 and 27, an extending part 13 of a top foil piece 11 of the top foil 10 of the first modification includes a fixed part 51 fixed to a base plate 30. The fixed part 51 of the extending part 13 is fixed to the base plate 30 through welding (spot-welding). The fixed part 51 is welded to the base plate 30 in a state where the extending part 13 is made to overlap the flat part 23 of the back foil piece 21 of the back foil 20, and both of the extending part 13 and the flat part 23 are fixed to the base plate 30 at the fixed part 51.

The region of the fixed part 51 in a plan view is less than each of the circumferential width and the radial length of the extending part 13. The fixed part 51 may be provided at any position of the extending part 13. The fixed part 51 may be provided on the radially inner side of the extending part 13, specifically, may be provided between the center in the radial direction of and the radially inner end of the extending part 13. In this case, the fixed part 51 and the sandwiched part 14 can effectively hold the extending part 13.

Since the inclined part 12 of the top foil piece 11 and the thrust collar 4 are in contact with each other at the time the thrust foil bearing 3 is started, when the rotary shaft 1 rotates to start the thrust collar 4 rotating, the inclined part 12 is subjected to a frictional force (solid frictional force) toward the other side in the circumferential direction (toward the trailing side in the rotation direction). Even in a case where a fluid lubricating film is being formed during the rotation of the thrust collar 4, when a large load is applied from the thrust collar 4 to the top foil piece 11, the thrust collar 4 may come into contact with the inclined part 12, and the inclined part 12 may be subjected to a frictional force toward the other side in the circumferential direction.

Even if a force toward the other side in the circumferential direction acts on the inclined part 12 of the top foil piece 11 in this way, since in the first modification, the extending part 13 is fixed to the base plate 30 through the fixed part 51, the above force is not only supported by the connection part 13*b* between the extending part 13 and the sandwiched part 14 but can also be supported by the fixed part 51. Therefore, a state where the extending part 13 is cantilevered by the sandwiched part 14 can be eliminated, a high stress can be limited from acting on the connection part 13*b*, and therefore even when the top foil piece 11 is subjected to a frictional force toward the other side in the circumferential direction, the top foil piece 11 can be prevented from deforming or breaking.

In the fixed part 51 of the first modification, the welding that may cause distortion to the top foil 10 is used. However, since the top foil piece 11 of the top foil 10 of the first modification is held by the sandwiched part 14 and the fixed part 51, the number of welded positions can be significantly decreased as compared to the conventional case. Therefore, it is possible to reduce the distortion caused to the top foil 10 and to limit the load capacity of the thrust foil bearing 3 from deteriorating due to the distortion of the top foil 10.

In the first modification, the flat part 23 of the back foil piece 21 is also fixed to the base plate 30 through the fixed part 51. Therefore, even if a load is applied from the inclined part 12 to the support 22 of the back foil piece 21, this load can be appropriately supported by the sandwiched part 24 and the fixed part 51. Consequently, an appropriate load capacity of the thrust foil bearing 3 can be maintained.

In FIG. 27, the bent part 25 and the insertion groove 31 of the first embodiment are omitted. In a case where the fixed part 51 is used, the bent part 25 and the insertion groove 31 may not be provided in the thrust foil bearing 3 or may be provided therein.

Instead of the above first modification, the following modifications may be adopted.

Figure 28:
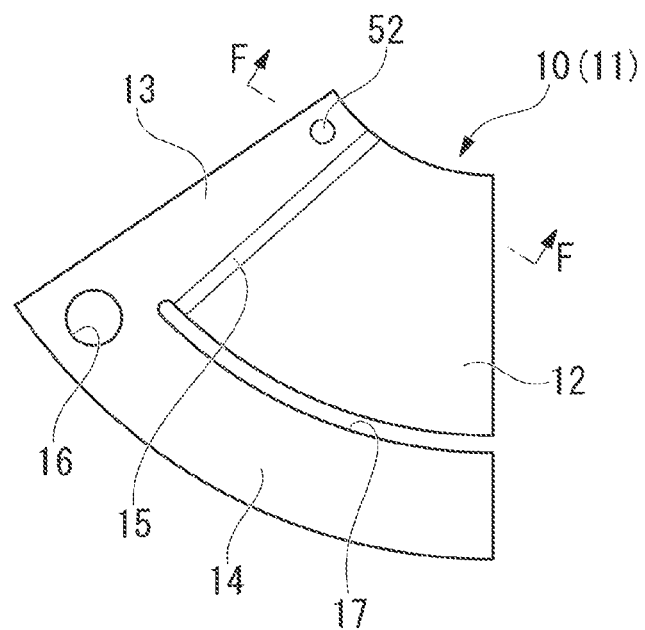
FIG. 28 is a plan view showing a top foil of a thrust foil bearing of a second modification of the first embodiment of the present disclosure.
Figure 29:
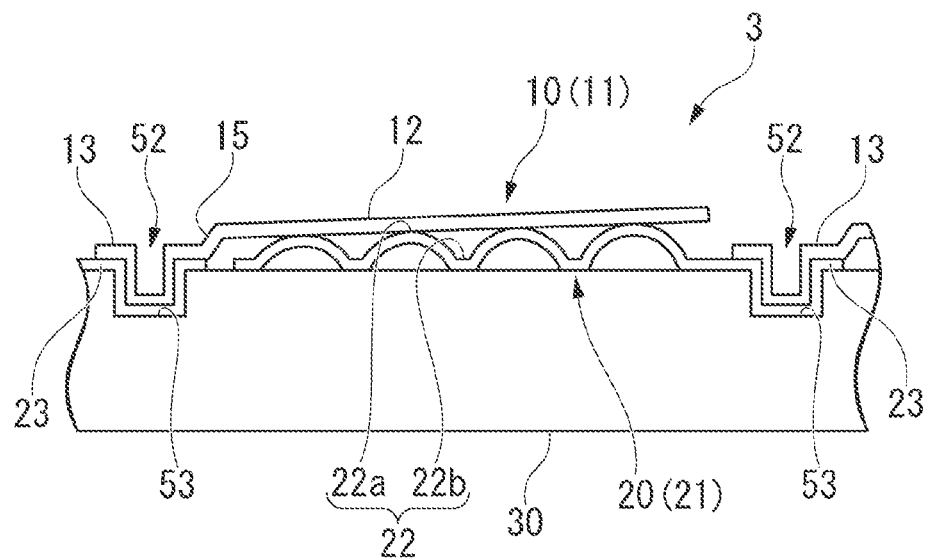
FIG. 29 is a cross-sectional view taken along line F-F and viewed in an arrow direction in FIG. 28.

FIG. 28 is a plan view showing a top foil 10 of a thrust foil bearing 3 of a second modification of the above first embodiment. FIG. 29 is a cross-sectional view taken along line F-F and viewed in an arrow direction in FIG. 28.

As shown in FIGS. 28 and 29, in the second modification, a fixed part 52 is provided instead of the fixed part 51 of the first modification. That is, an extending part 13 of a top foil piece 11 of the second modification includes the fixed part 52 that is fixed to the base plate 30. The fixed part 52 of the extending part 13 is fixed to the base plate 30 through caulking. The base plate 30 is provided with a hole 53 having a circular shape in a plan view. The extending part 13 is pressed by a pressing tool (not shown) while overlapping the flat part 23 of the back foil piece 21, and parts of the extending part 13 and the flat part 23 protrude toward the inside of the hole 53 through plastic deformation, thereby being fitted and fixed into the hole 53. The other configurations of the second modification are equivalent to the first modification.

Figure 30:
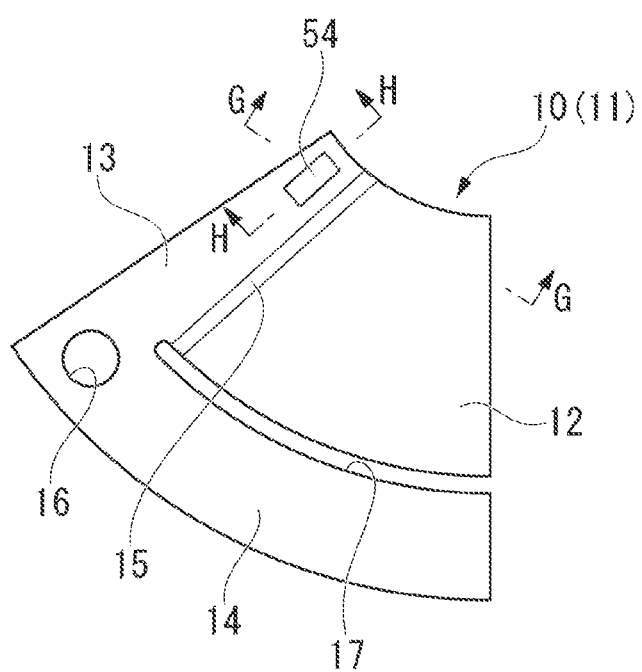
FIG. 30 is a plan view showing a top foil of a thrust foil bearing of a third modification of the first embodiment of the present disclosure.
Figure 31:
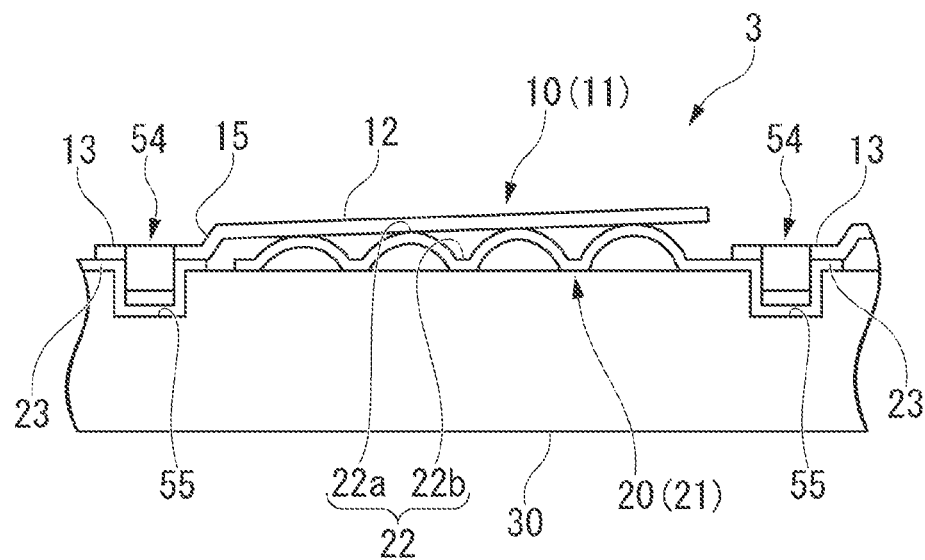
FIG. 31 is a cross-sectional view taken along line G-G and viewed in an arrow direction in FIG. 30.
Figure 32:
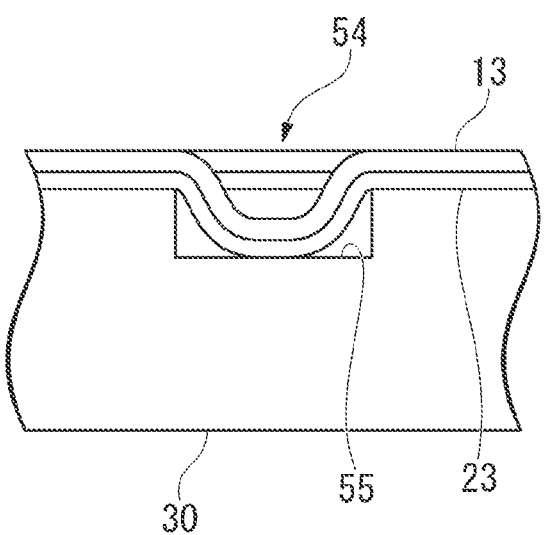
FIG. 32 is a cross-sectional view taken along line H-H and viewed in an arrow direction in FIG. 30.

FIG. 30 is a plan view showing a top foil 10 of a thrust foil bearing 3 of a third modification of the above first embodiment. FIG. 31 is a cross-sectional view taken along line G-G and viewed in an arrow direction in FIG. 30. FIG. 32 is a cross-sectional view taken along line H-H and viewed in an arrow direction in FIG. 30.

As shown in FIGS. 30 to 32, in the third modification, a fixed part 54 is provided instead of the fixed part 51 of the first modification. That is, an extending part 13 of a top foil piece 11 of the third modification includes the fixed part 54 that is fixed to the base plate 30. The fixed part 54 of the extending part 13 is fixed to the base plate 30 through caulking. The base plate 30 is provided with a hole 55 having a rectangular shape in a plan view. The extending part 13 is pressed by a pressing tool (not shown) while overlapping the flat part 23 of the back foil piece 21, and parts of the extending part 13 and the flat part 23 protrude toward the inside of the hole 55 through plastic deformation, thereby being fitted and fixed into the hole 55. The other configurations of the third modification are equivalent to the first modification.

Figure 33:
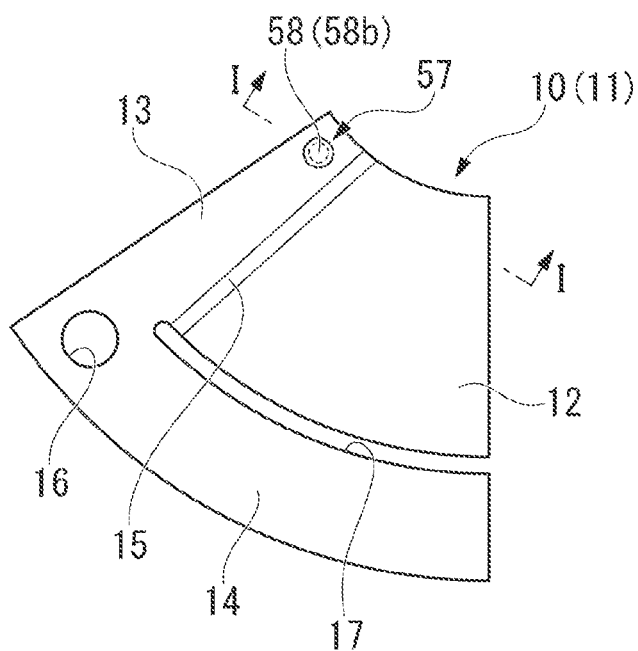
FIG. 33 is a plan view showing a top foil of a thrust foil bearing of a fourth modification of the first embodiment of the present disclosure.
Figure 34:
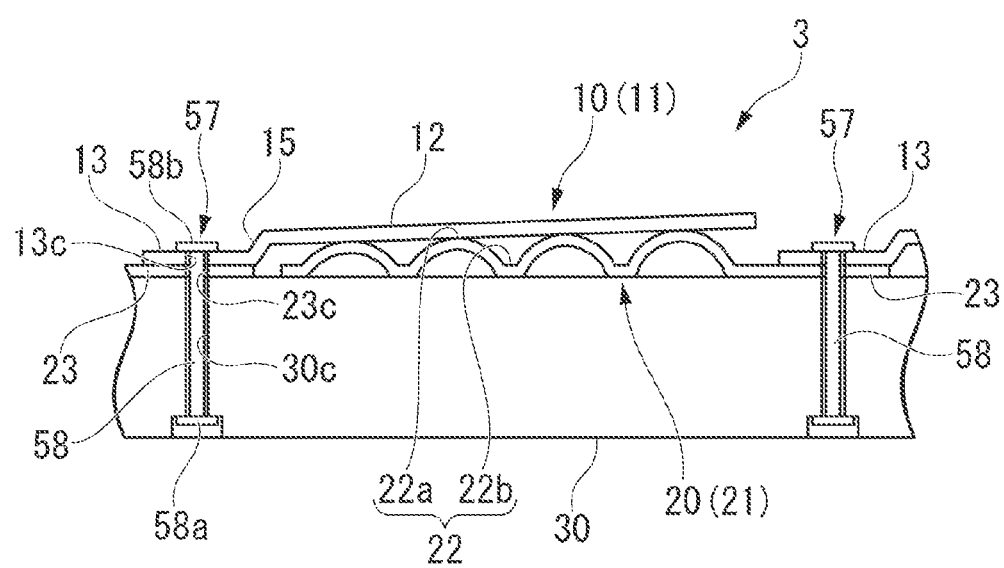
FIG. 34 is a cross-sectional view taken along line I-I and viewed in an arrow direction in FIG. 33.

FIG. 33 is a plan view showing a top foil 10 of a thrust foil bearing 3 of a fourth modification of the above first embodiment. FIG. 34 is a cross-sectional view taken along line I-I and viewed in an arrow direction in FIG. 33.

As shown in FIGS. 33 and 34, in the fourth modification, a fixed part 57 is provided instead of the fixed part 51 of the first modification. That is, an extending part 13 of a top foil piece 11 of the fourth modification includes the fixed part 57 that is fixed to the base plate 30. The fixed part 57 of the extending part 13 is fixed to the base plate 30 using a rivet 58. The rivet 58 is inserted through a through-hole 30*c* provided in the base plate 30, a through-hole 23*c* provided in the flat part 23, and a through-hole 13*c* provided in the extending part 13. One head 58*a* of the rivet 58 is locked to the base plate 30, and another head 58*b* of the rivet 58 is locked to the extending part 13, whereby the extending part 13 and the flat part 23 are fixed to the base plate 30. The head 58*b* is disposed at a position closer to the base plate 30 in the axial direction than an end part on the other side in the circumferential direction of the inclined part 12. Therefore, even when the thrust collar 4 pushes the top foil piece 11, it is possible to limit the thrust collar 4 from contacting the head 58*b*. The other configurations of the fourth modification are equivalent to the first modification.

Figure 35:
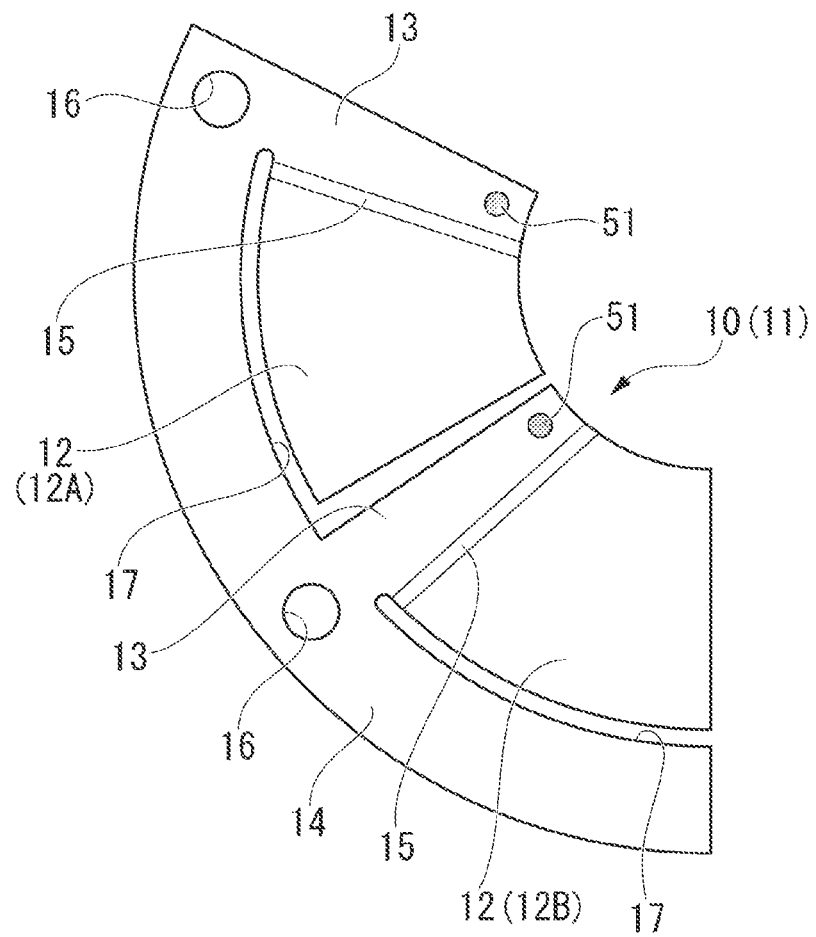
FIG. 35 is a plan view showing a top foil of a thrust foil bearing of a modification of the second embodiment of the present disclosure.
Figure 36:
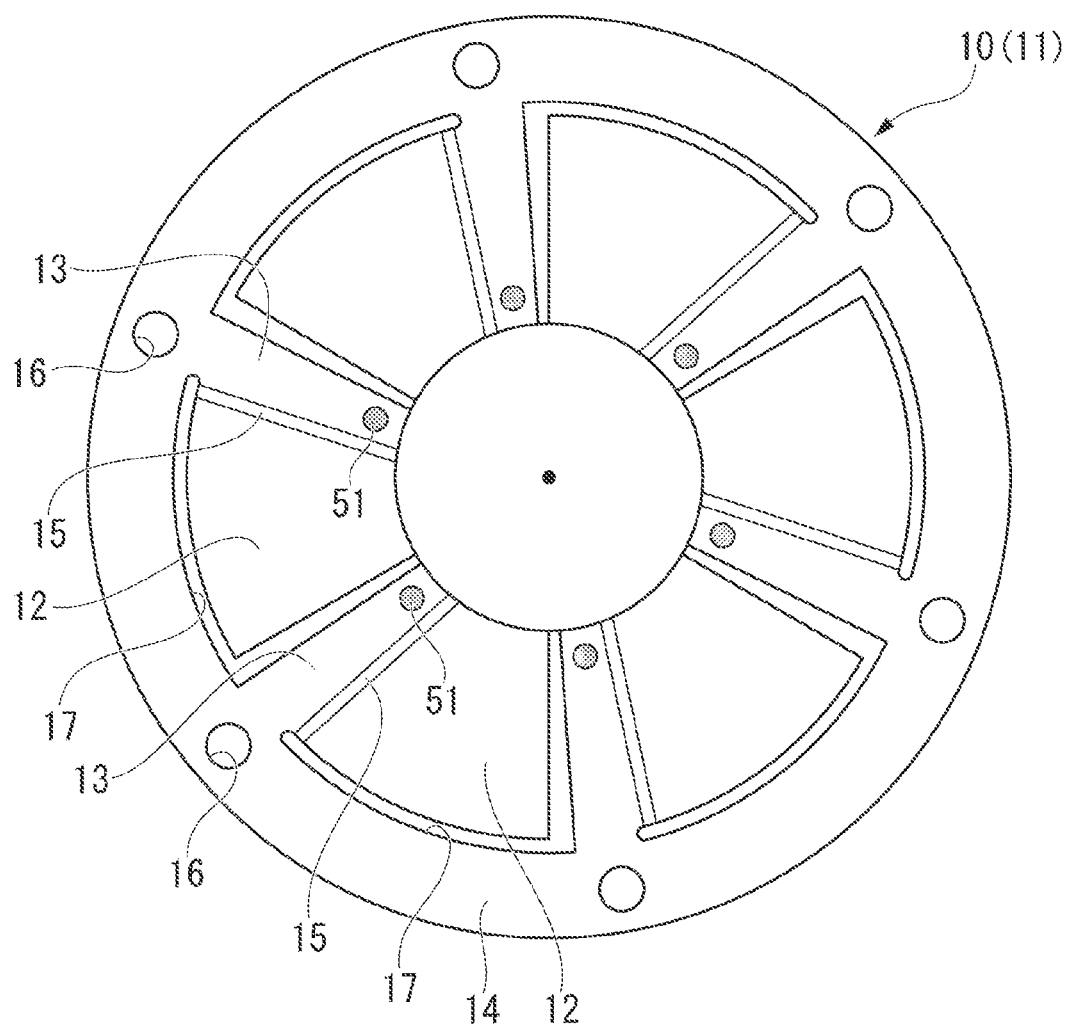
FIG. 36 is a plan view showing a top foil of a thrust foil bearing of a modification of the third embodiment of the present disclosure.

Each of the above-described first to fourth modifications of the first embodiment can be applied to another embodiment, that is, the above second to fifth embodiments. For example, if the first modification is applied to the second embodiment, as shown in FIG. 35, the fixed part 51 is provided in each radially inner side of the two extending parts 13 included in the top foil piece 11. If the first modification is applied to the third embodiment, as shown in FIG. 36, the fixed part 51 is provided in each radially inner side of the six extending parts 13 included in the top foil piece 11.

In the first to fourth modifications, the extending part 13 is fixed to the base plate 30 through the flat part 23, that is, both of the extending part 13 and the flat part 23 are fixed to the base plate 30 through the fixed part, but the present disclosure is not limited to this configuration. A configuration may be used in which the fixed part of the above first to fourth modifications fixes the flat part 23 of the back foil piece 21 to the base plate 30 and does not fix the extending part 13 of the top foil piece 11 thereto, and the extending part 13 is held only by the sandwiched part 14 sandwiched between the base plate 30 and the bearing spacer 40.

On the other hand, a configuration may be used in which the fixed part of the above first to fourth modifications fixes only the extending part 13 of the top foil piece 11 to the base plate 30, the back foil 20 is provided with no sandwiched part 24, and the back foil piece 21 is formed only of the support 22.

Figure 37:
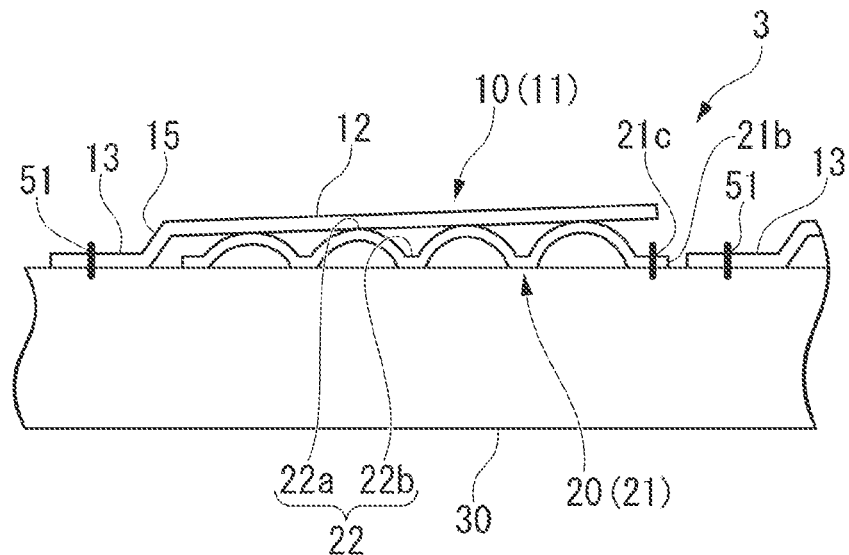
FIG. 37 is a cross-sectional view showing a thrust foil bearing of a fifth modification of the first embodiment of the present disclosure.
Figure 38:
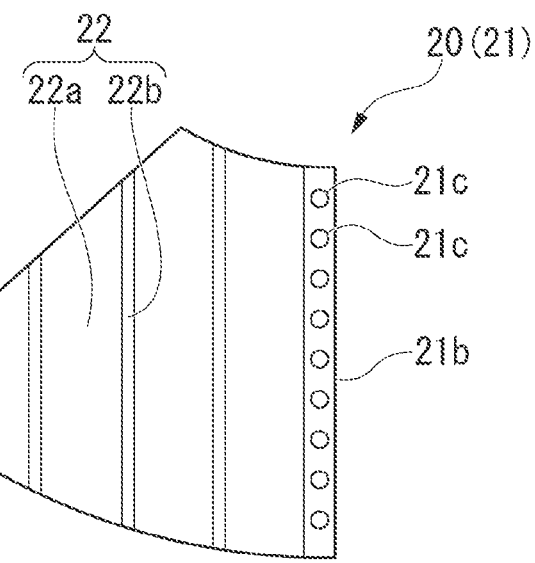
FIG. 38 is a plan view of a back foil piece of the thrust foil bearing of the fifth modification of the first embodiment of the present disclosure.

FIG. 37 is a cross-sectional view showing a thrust foil bearing 3 of a fifth modification of the above first embodiment. FIG. 38 is a plan view of a back foil piece 21 of the thrust foil bearing 3 of the fifth modification of the above first embodiment.

As shown in FIGS. 37 and 38, the fifth modification has a configuration in which the fixed part 51 of the first modification fixes only the extending part 13 to the base plate 30, and the back foil piece 21 is formed only of the support 22.

As shown in FIG. 38, an end part 21b on the other side in the circumferential direction of the back foil piece 21 is welded (spot-welded) to the base plate 30 at a plurality of points. That is, the back foil piece 21 is fixed to the base plate 30 through a plurality of welded parts 21c.

Figure 39:
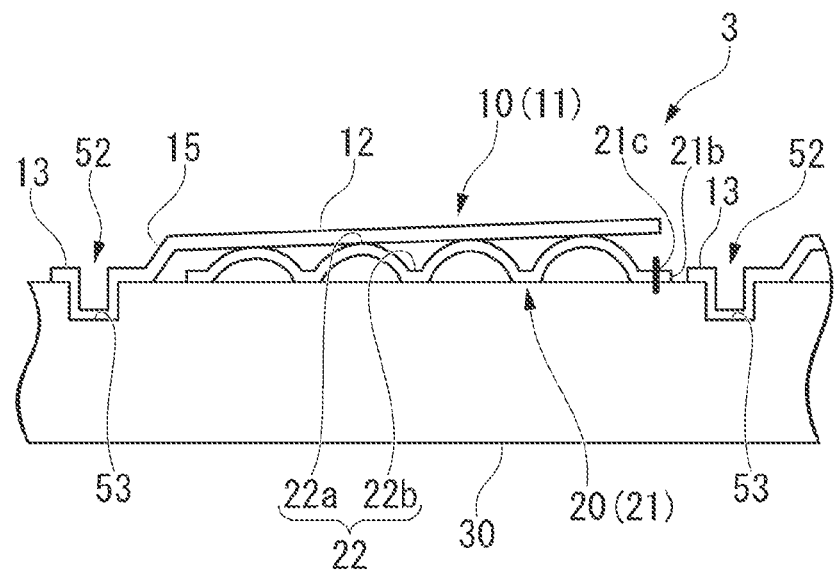
FIG. 39 is a cross-sectional view showing a thrust foil bearing of a sixth modification of the first embodiment of the present disclosure.

FIG. 39 is a cross-sectional view showing a thrust foil bearing 3 of a sixth modification of the above first embodiment.

As shown in FIG. 39, the sixth modification has a configuration in which the fixed part 52 of the second modification fixes only the extending part 13 to the base plate 30. The other configurations of the sixth modification are equivalent to the fifth modification.

Figure 40:
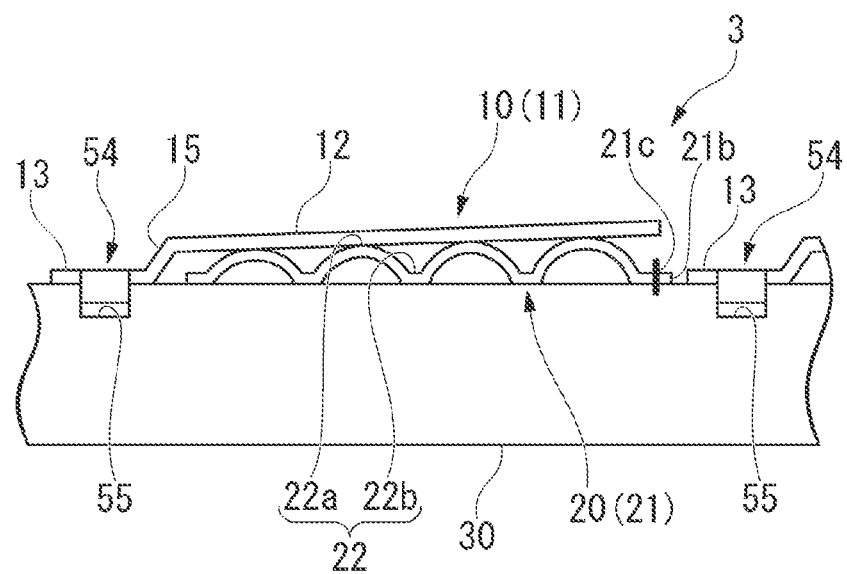
FIG. 40 is a cross-sectional view showing a thrust foil bearing of a seventh modification of the first embodiment of the present disclosure.

FIG. 40 is a cross-sectional view showing a thrust foil bearing 3 of a seventh modification of the above first embodiment.

As shown in FIG. 40, the seventh modification has a configuration in which the fixed part 54 of the third modification fixes only the extending part 13 to the base plate 30. The other configurations of the seventh modification are equivalent to the fifth modification.

Figure 41:
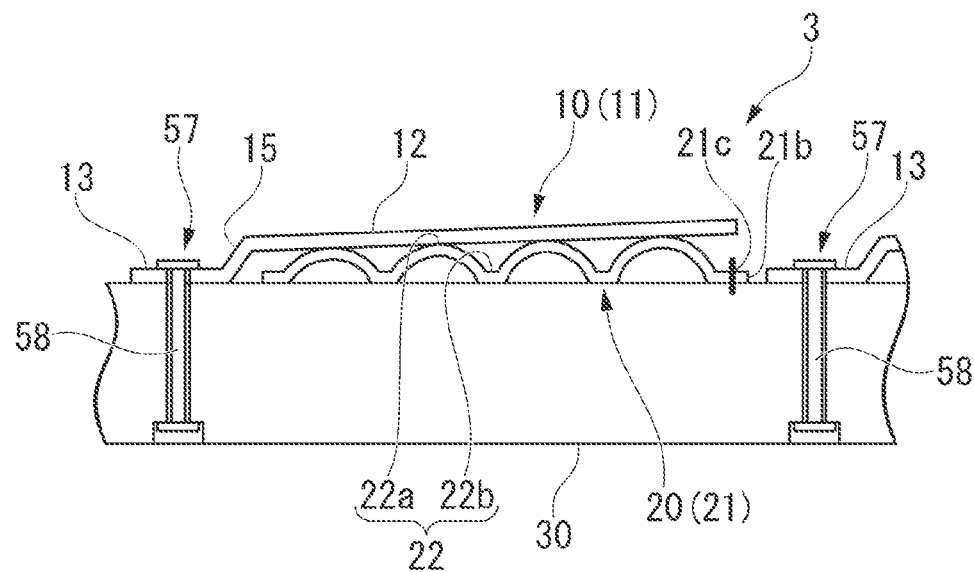
FIG. 41 is a cross-sectional view showing a thrust foil bearing of an eighth modification of the first embodiment of the present disclosure.

FIG. 41 is a cross-sectional view showing a thrust foil bearing 3 of an eighth modification of the above first embodiment.

As shown in FIG. 41, the eighth modification has a configuration in which the fixed part 57 of the fourth modification fixes only the extending part 13 to the base plate 30. The other configurations of the eighth modification are equivalent to the fifth modification.

Each of the above-described fifth to eighth modifications of the first embodiment can be applied to another embodiment, that is, the above second to fifth embodiments.

In the above first to eighth modifications, the extending part 13 or the flat part 23 is fixed to the base plate 30 using the welding (spot-welding), the caulking or the rivet, but the present disclosure is not limited to these configurations, and a configuration may be used in which the fixed part fixes the extending part 13 or the flat part 23 to the base plate 30 through adhesive-fixing or screwing.

INDUSTRIAL APPLICABILITY

The present disclosure can be used for a thrust foil bearing that is disposed to face a thrust collar provided on a rotary shaft.

The invention claimed is:

1. A thrust foil bearing, comprising:
a base plate including an insertion hole through which a shaft is inserted; and
a top foil disposed around the insertion hole, wherein the top foil includes:
a slit dividing the top foil into an inner area and an outer area in a radial direction of the insertion hole,
a sandwiched part disposed in the outer area,
an extending part extending from the sandwiched part to the inner area, and
an inclined part being in the inner area, having an end on one side in a circumferential direction of the insertion hole connected to the extending part through a first bent part, extending from the first bent part toward another side in the circumferential direction, and inclined with respect to a flat surface of the base plate extending a direction orthogonal to an axial direction of the insertion hole,
the extending part, the first bent part, and the inclined part are disposed in this order in the circumferential direction,
the first bent part is formed of a first bend and a second bend positioned on the other side in the circumferential direction of the first bend, the first bend is bent to be convex toward the base plate, the second bend is bent to be convex in a direction away from the base plate,
the slit extends further toward the one side in the circumferential direction than the first bent part.

2. The thrust foil bearing according to claim 1, wherein an annular member is attached to the base plate, and
the sandwiched part is sandwiched between the base plate and the annular member.

3. The thrust foil bearing according to claim 2, comprising a fastening member attaching the annular member to the base plate, wherein
the sandwiched part is provided with a through-hole through which the fastening member is inserted.

4. The thrust foil bearing according to claim 3, wherein a plurality of the through-holes are provided in the sandwiched part.

5. The thrust foil bearing according to claim 1, wherein the sandwiched part is formed into an annular shape.

6. The thrust foil bearing according to claim 1, wherein the sandwiched part is connected with a plurality of the inclined parts through a plurality of the extending parts,
the slit extends from an edge on the other side in the circumferential direction of the inclined part toward the one side in the circumferential direction, and
the top foil is provided with a second slit, the second slit extending from a radially inner side toward a radially outer side along the edge on the other side in the circumferential direction of the inclined part and being connected to the slit at a position on the radially outer side of the inclined part.

7. The thrust foil bearing according to claim 1, wherein an end on the other side in the circumferential direction of the inclined part is a free end.

8. The thrust foil bearing according to claim 1, wherein an end on the one side in the circumferential direction of the extending part is provided with a second bent part, the second bent part being bent such that an end of the second bent part extends toward the base plate or being bent such that an end of the second bent part is away from the base plate.

9. The thrust foil bearing according to claim 8, wherein the base plate is provided with an insertion groove into which the second bent part being bent toward the base plate is inserted.

10. The thrust foil bearing according to claim 1, wherein the extending part includes a fixed part that is fixed to the base plate.

* * * * *